US012448879B2

(12) United States Patent
Li et al.

(10) Patent No.: US 12,448,879 B2
(45) Date of Patent: Oct. 21, 2025

(54) GEOSTEERING CONTROL FRAMEWORK

(71) Applicant: Schlumberger Technology Corporation, Sugar Land, TX (US)

(72) Inventors: Zhenhua Li, Singapore (SG); Farid Toghi, Beijing (CN); Zhiyi Zhang, Beijing (CN); Ziyuan Xu, Beijing (CN); Bingqi Liu, Beijing (CN); Ji Li, Houston, TX (US); Yao Feng, Sugar Land, TX (US); Jianguo Liu, Sugar Land, TX (US); Michael Bower, Sugar Land, TX (US); Joseph Gremillion, Sugar Land, TX (US); Jiazhen Yang, Beijing (CN); Yan Song Huang, Beijing (CN); Jing Wang, Beijing (CN); Yue Qiu, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/433,842

(22) Filed: Feb. 6, 2024

(65) Prior Publication Data

US 2025/0250891 A1 Aug. 7, 2025

(51) Int. Cl.

| | |
|---|---|
| ***E21B 44/00*** | (2006.01) |
| ***E21B 7/04*** | (2006.01) |
| ***E21B 47/18*** | (2012.01) |
| ***E21B 49/00*** | (2006.01) |
| ***G01V 3/20*** | (2006.01) |

(52) U.S. Cl.

CPC ................ *E21B 44/00* (2013.01); *E21B 7/04* (2013.01); *E21B 47/18* (2013.01); *E21B 49/00* (2013.01); *G01V 3/20* (2013.01); *E21B 2200/20* (2020.05); *E21B 2200/22* (2020.05)

(58) Field of Classification Search

CPC . E21B 44/00; E21B 7/04; E21B 47/18; E21B 49/00; E21B 2200/20; E21B 2200/22; G01V 3/20

See application file for complete search history.

(56) References Cited

U.S. PATENT DOCUMENTS

| | | | | |
|---|---|---|---|---|
| 10,802,171 | B2 | 10/2020 | Meek | |
| 2014/0000964 | A1* | 1/2014 | Selman | E21B 44/00 175/24 |
| 2020/0011158 | A1* | 1/2020 | Xu | E21B 44/005 |

(Continued)

OTHER PUBLICATIONS

Mitkus, A. et al. "How a Bayesian Approach Can Overcome Noisy Data and Interpretation Ambiguity in Automated Geosteering" IADC/SPE-212544-MS, presented at the SPE/IADC International Drilling Conference and Exhibition, Stavanger, Norway, 2023, 12 pages.

(Continued)

*Primary Examiner* — Dany E Akakpo

(74) *Attorney, Agent, or Firm* — Jeffrey D. Frantz

(57) ABSTRACT

A system and method may include receiving data acquired by a downhole tool of a tool string disposed at least in part in a borehole in a subsurface region. The system and method may also include inverting the data using a trained machine learning model to generate a structural feature of the subsurface region. The system and method may further include controlling operation of the tool string based at least in part on the structural feature of the subsurface region.

20 Claims, 14 Drawing Sheets

(56) References Cited

U.S. PATENT DOCUMENTS

| | | | | |
|---|---|---|---|---|
| 2023/0041525 | A1 | 2/2023 | Hong | |
| 2023/0145563 | A1* | 5/2023 | Pan | E21B 49/00 324/346 |

OTHER PUBLICATIONS

Xie, H. et al., "An Advanced Ultrahigh-Definition Directional Electromagnetic Propagation Logging Tool for Mapping While Drilling and Multilayered Formation Evaluation" SPWLA-2022-0050, presented at the SPWLA 63rd Annual Logging Symposium, Stavanger, Norway, 2022, 14 pages.

* cited by examiner

500

1000

GEOSTEERING CONTROL FRAMEWORK

BACKGROUND

Geosteering may provide for directional control of a drill bit of a drillstring using downhole geological logging measurements, for example, to keep a directional wellbore within a pay zone. In various scenarios, geosteering may be used to keep a wellbore in a particular section of a reservoir to minimize gas or water breakthrough and maximize hydrocarbon production.

SUMMARY

A method may include receiving data acquired by a downhole tool of a tool string disposed at least in part in a borehole in a subsurface region; inverting the data using a trained machine learning model to generate a structural feature of the subsurface region; and controlling operation of the tool string based at least in part on the structural feature of the subsurface region. A system may include a processor; memory accessible to the processor; processor-executable instructions stored in the memory and executable by the processor to instruct the system to: receive data acquired by a downhole tool of a tool string disposed at least in part in a borehole in a subsurface region; invert the data using a trained machine learning model to generate a structural feature of the subsurface region; and control operation of the tool string based at least in part on the structural feature of the subsurface region. One or more non-transitory computer-readable storage media may include processor-executable instructions executable to instruct a processor to: receive data acquired by a downhole tool of a tool string disposed at least in part in a borehole in a subsurface region; invert the data using a trained machine learning model to generate a structural feature of the subsurface region; and control operation of the tool string based at least in part on the structural feature of the subsurface region. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations may be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, geosteering may provide for directional control of a drill bit of a drillstring using downhole geological logging measurements, for example, to keep a directional wellbore within a pay zone where, in various scenarios, geosteering may be used to keep a wellbore in a particular section of a reservoir to minimize gas or water breakthrough and maximize hydrocarbon production.

A borehole may be referred to as a wellbore and may include an openhole portion or an uncased portion and/or may include a cased portion. A borehole may be defined by a bore wall that is composed of rock that bounds the borehole. As to a well or a borehole, whether for one or more of exploration, sensing, production, injection or other operation(s), it may be planned. Such a process may be referred to generally as well planning, a process by which a path may be mapped in a geologic environment. Such a path may be referred to as a trajectory, which may include coordinates in a three-dimensional coordinate system where a measure along the trajectory may be a measured depth (MD), a total vertical depth (TVD) or another type of measure.

As an example, drilling may include using one or more logging tools that may perform one or more logging operations while drilling or otherwise with a drillstring (e.g., while stationary, while tripping in, tripping out, etc.). As an example, drilling and/or one or more other operations may occur responsive to measurements. For example, a logging while drilling operation may acquire measurements and adjust drilling based at least in part on such measurements. In such an example, adjustments may be made by actuating one or more geosteering actuators that may provide for orienting a drill bit of a drillstring.

Figure 1:
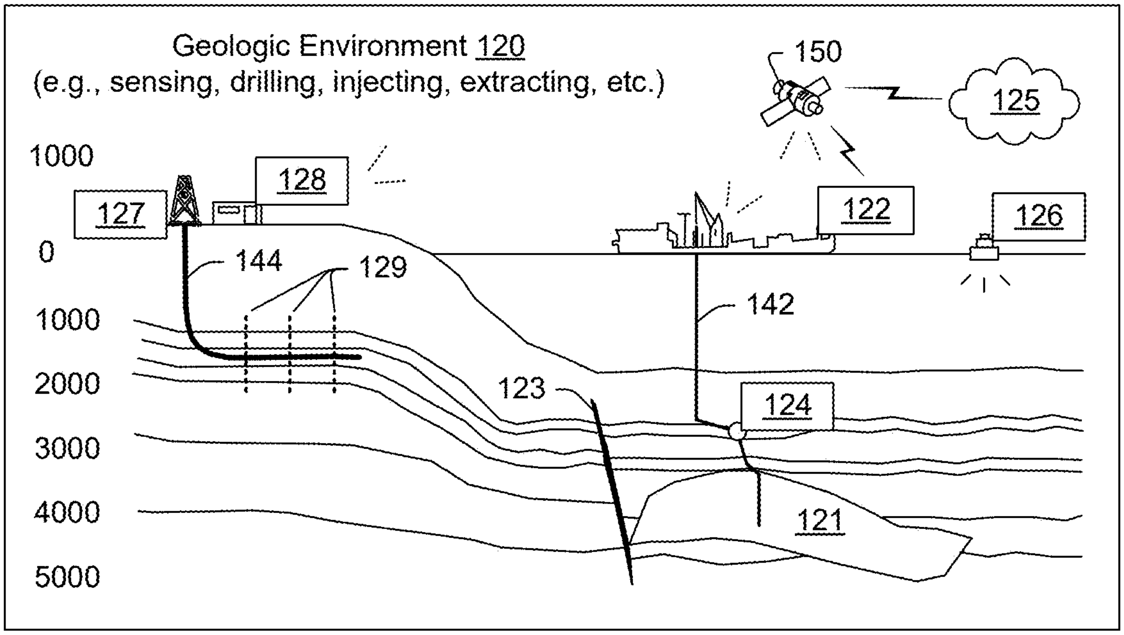
FIG. 1 illustrates examples of equipment in a geologic environment.
Figure 1:
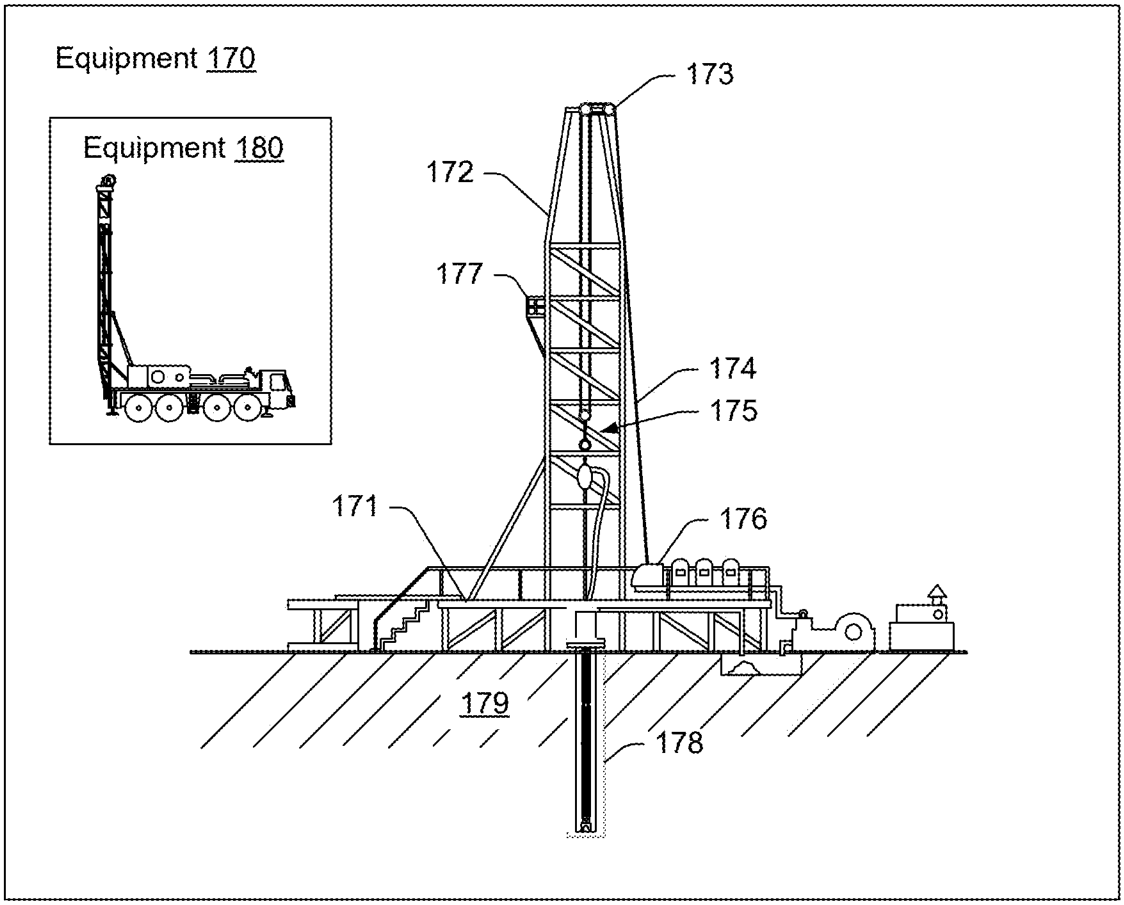

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. For example, the downhole equipment 124 may be disposed in a bore 142 that is formed by a borewall of one or more types of rock. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite 150 in communication with the network 125 that may be configured for communications, noting that the satellite 150 may additionally or alternatively include circuitry for imagery (e.g., spatial, spectral, temporal, radiometric, etc.).

FIG. 1 also shows the geologic environment 120 as optionally including equipment 127 and 128 associated with a well 144 that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, NMR logging, assessment of one or more fractures, injection, production, etc. As an example, the equipment 127 and/or 128 may provide for measurement, collection, communication, storage, analysis, etc. of data such as, for example, formation data, fluid data, production data (e.g., for one or more produced resources), etc. As an example, one or more satellites such as the satellite 150 may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 may be mobile as carried by a vehicle; noting that the equipment 170 may be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block assembly 175 may provide an indication as to how much pipe has been deployed. As shown, movement of the traveling block assembly 175 may provide for movement of equipment into and out of a bore 178 in a formation 179.

A derrick may be a structure used to support a crown block and a traveling block operatively coupled to the crown block at least in part via line. A derrick may be pyramidal in shape and offer a suitable strength-to-weight ratio. A derrick may be movable as a unit or in a piece-by-piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line may cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block may include a set of pulleys (e.g., sheaves) that may be located at or near a top of a derrick or a mast, over which line is threaded. A traveling block may include a set of sheaves that may be moved up and down in a derrick or a mast via line threaded in the set of sheaves of the traveling block and in the set of sheaves of a crown block. A crown block, a traveling block and a line may form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick may include a landing on which a derrick person may stand. As an example, such a landing may be about 10 meters or more above a rig floor. In an operation referred to as trip out of the hole (TOH or pull out of hole (POOH)), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore (e.g., pull out of hole (POOH)) and/or placing equipment in a bore (e.g., run in hole (RIH)). As an example, equipment may include a drillstring that may be pulled out of the hole and/or may be place or replaced in the hole. As an example, a pipe trip may be performed where a drill bit has dulled or has otherwise ceased to drill efficiently and is to be replaced. As an example, a trip may be performed when changing section diameter, for example, upon finishing a larger bore diameter section changing equipment to drill a smaller bore diameter section.

Figure 2:
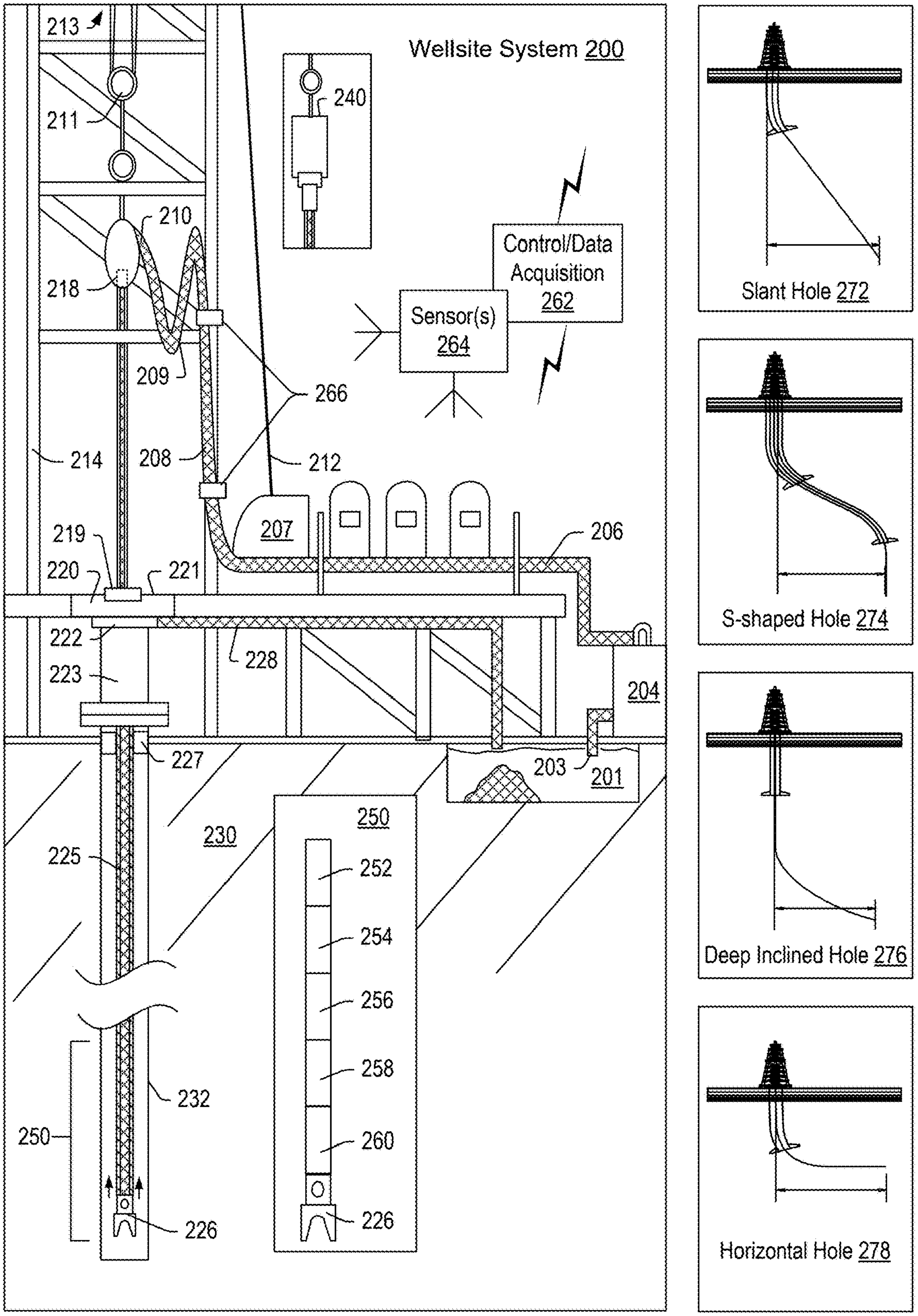
FIG. 2 illustrates an example of a system and examples of types of holes.

FIG. 2 shows an example of a wellsite system 200 (e.g., at a wellsite that may be onshore or offshore). As shown, the wellsite system 200 may include a mud tank 201 for holding mud and other material (e.g., where mud may be a drilling fluid that may help to transport cuttings, etc.), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling or one or more other types of drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 may provide for operation of the drillstring 225 and other operations. As shown, the wellsite system 200 includes the platform 215 and the derrick 214 positioned over the borehole 232. As mentioned, the wellsite system 200 may include the rotary table 220 where the drillstring 225 passes through an opening in the rotary table 220.

As shown in the example of FIG. 2, the wellsite system 200 may include the kelly 218 and associated components, etc., or a top drive 240 and associated components. As to a kelly example, the kelly 218 may be a square or hexagonal metal/alloy bar with a hole drilled therein that serves as a mud flow path. The kelly 218 may be used to transmit rotary motion from the rotary table 220 via the kelly drive bushing 219 to the drillstring 225, while allowing the drillstring 225 to be lowered or raised during rotation. The kelly 218 may pass through the kelly drive bushing 219, which may be driven by the rotary table 220. As an example, the rotary table 220 may include a master bushing that operatively couples to the kelly drive bushing 219 such that rotation of the rotary table 220 may turn the kelly drive bushing 219 and hence the kelly 218. The kelly drive bushing 219 may include an inside profile matching an outside profile (e.g., square, hexagonal, etc.) of the kelly 218; however, with slightly larger dimensions so that the kelly 218 may freely move up and down inside the kelly drive bushing 219.

As to a top drive example, the top drive 240 may provide functions performed by a kelly and a rotary table. The top drive 240 may turn the drillstring 225. As an example, the top drive 240 may include one or more motors (e.g., electric and/or hydraulic) connected with appropriate gearing to a short section of pipe called a quill, that in turn may be screwed into a saver sub or the drillstring 225 itself. The top drive 240 may be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 may hold mud, which may be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud may then flow via a passage (e.g., or passages) in the drillstring 225 and out of ports located on the drill bit 226 (see, e.g., a directional arrow). As the mud exits the drillstring 225 via ports in the drill bit 226, it may then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud may be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more components of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud may cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring may include a plurality of tools.

As to an RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling may commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; noting that a mud motor may present some challenges depending on factors such as rate of penetration (ROP), transferring weight to a bit (e.g., weight on bit, WOB) due to friction, etc. A mud motor may be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM may operate in a so-called sliding mode, when the drillstring is not rotated from the surface.

An RSS may drill directionally where there is continuous rotation from surface equipment, which may alleviate the sliding of a steerable motor (e.g., a PDM). An RSS may be deployed when drilling directionally (e.g., deviated, horizontal, or extended-reach wells). An RSS may aim to minimize interaction with a borehole wall, which may help to preserve borehole quality. An RSS may aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and may contain one or a plurality of selected types of logging tools (e.g., NMR unit or units, etc.). It will also be understood that one or more LWD and/or MWD modules may be employed at one or more positions. An LWD module may include capabilities for measuring, processing, and storing information, as well as for communicating with the surface equipment. In the illustrated example, the LWD module 254 may include a seismic measuring device, an NMR measuring device, etc.

The MWD module 256 may be housed in a suitable type of drill collar and may contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller may generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

As an example, one or more NMR measuring devices (e.g., NMR units, etc.) may be included in a drillstring (e.g., a BHA, etc.) where, for example, measurements may support one or more of geosteering, geostopping, trajectory optimization, etc. As an example, motion characterization data may be utilized for control of NMR measurements (e.g., acquisition, processing, quality assessment, etc.).

FIG. 2 also shows some examples of types of holes that may be drilled. For example, consider a slant hole 272, an S-shaped hole 274, a deep inclined hole 276 and a horizontal hole 278.

As an example, a drilling operation may include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees. As an example, a trajectory and/or a drillstring may be characterized in part by a dogleg severity (DLS), which may be a two-dimensional parameter specified in degrees per 30 meters (e.g., or degrees per 100 feet).

As an example, a directional well may include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, consider a drillstring that may include a positive displacement motor (PDM).

As an example, a system may be a steerable system and include equipment to perform a method such as geosteering. As mentioned, a steerable system may be or include an RSS. As an example, a steerable system may include a PDM and/or a turbine on a lower part of a drillstring which, just above a drill bit, a bent sub may be mounted. Geosteering equipment of a drillstring may include one or more geosteering actuators that may provide for orienting a drill bit of the drillstring. For example, an actuator that may include a piston that moves a pad for providing a force that may be exerted against a borehole wall thus steering a bottom hole assembly (e.g., orienting a drill bit of the bottom hole assembly). As an example, an actuator may be a bent downhole motor, which may be actuated via one or more processes. As an example, a bent drilling motor may be used with a fixed bend that cannot be varied during normal operation or with a variable bend that, for example, may be varied based on a geosteering command. As an example, for a variable bend drilling motor, one or more actuators may be included that may be configured to create or vary a bend, thereby affecting the steering behavior of the steering system. As an example, an actuator may be a downhole actuator that may adjust orientation downhole and/or an actuator may be a surface actuator that may perform an action uphole (e.g., at surface) to adjust orientation downhole.

As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment may make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, may allow for implementing a geosteering method. Such a method may include navigating a subsurface environment, for example, to follow a desired route to reach a desired target or targets.

As an example, a drillstring may include one or more of an azimuthal density neutron (ADN) tool for measuring density and porosity; a MWD tool for measuring inclination, azimuth and shocks; a compensated dual resistivity (CDR) tool for measuring resistivity and gamma ray related phenomena; a combinable magnetic resonance (CMR) tool for measuring properties (e.g., relaxation properties, etc.); one or more variable gauge stabilizers; one or more bend joints; and a geosteering tool, which may include a motor and optionally equipment for measuring and/or responding to one or more of inclination, resistivity and gamma ray related phenomena.

As an example, a tool such as the ECOSCOPE tool (SLB, Houston, Texas) may be utilized to acquire measurements. Such a tool may include one or more PNGs and associated detectors. Such a tool may include features for one or more of resistivity, neutron porosity, azimuthal gamma ray, density, elemental capture spectroscopy and sigma measurements. For example, consider features for one or more of 2 MHz and 400 kHz propagation resistivity, elemental capture spectroscopy, neutron-gamma density, capture cross section (sigma), azimuthal bulk density, azimuthal photoelectric factor, azimuthal natural gamma ray, density caliper, ultrasonic caliper, annular pressure and temperature while drilling, triaxial shocks and vibration, and near-bit borehole inclination. Such a tool may be operatively coupled to one or more telemetry systems that may provide for real-time acquisition and, for example, real-time decision making, rendering of graphics, etc. As an example, such a tool may be operatively coupled to one or more types of circuitries, which may, for example, perform computations downhole using measurements acquired downhole.

As an example, a tool such as the PERISCOPE tool (SLB, Houston, Texas) may be utilized to acquire measurements. For example, consider measurements such as resistivity, which may be acquired using one or more types of receivers. As an example, a receiver may be or include an antenna. For example, the PERISCOPE tool may include tilted, axial, and transverse antenna. As an example, data acquired from such a tool may provide for identification of layers, number of layers, position of a layer or layers, within a distance of 1 meter or more (e.g., up to or more than 8 meters).

As to sigma measurements (e.g., sigma data), sigma is the macroscopic cross section for the absorption of thermal neutrons, or capture cross section, of a volume of matter, measured in capture units (c.u.). A sigma log is the principal output of a pulsed neutron capture log, which may be used for one or more purposes.

As an example, one or more types of nuclear measurements may be acquired by one or more tools where such nuclear measurements may include one or more of electron density ($\rho_e$), hydrogen index (HI), and thermal neutron capture cross section (sigma or $\Sigma$).

As an example, geosteering may include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 may include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 may be provided for tracking pipe, tracking movement of at least a portion of a drillstring, etc.

As an example, the system 200 may include one or more sensors 266 that may sense and/or transmit signals to a fluid conduit such as a drilling fluid conduit (e.g., a drilling mud conduit). For example, in the system 200, the one or more sensors 266 may be operatively coupled to portions of the standpipe 208 through which mud flows. As an example, a downhole tool may generate pulses that may travel through the mud and be sensed by one or more of the one or more sensors 266 (e.g., consider mud-pulse telemetry). In such an example, the downhole tool may include associated circuitry such as, for example, encoding circuitry that may encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 may include a transmitter that may generate signals that may be transmitted downhole via mud (e.g., drilling fluid) as a transmission medium.

Analysis of formation information acquired by one or more tools may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). A reservoir may be a porous formation where fluid may be within various pores of the porous formation and amenable to movement (e.g., to produce fluid from the reservoir). As an example, information acquired by a tool or tools may be analyzed using a framework such as the TECHLOG framework (SLB, Houston, Texas). As an example, the TECHLOG framework may be interoperable with one or more other frameworks such as, for example, the PETREL framework (SLB, Houston, Texas). As an example, a computational environment such as, for example, the DELFI environment (SLB, Houston, Texas) may be utilized, which may provide for utilization of the PETREL framework and other frameworks, optionally in interrelated manners.

Figure 3:
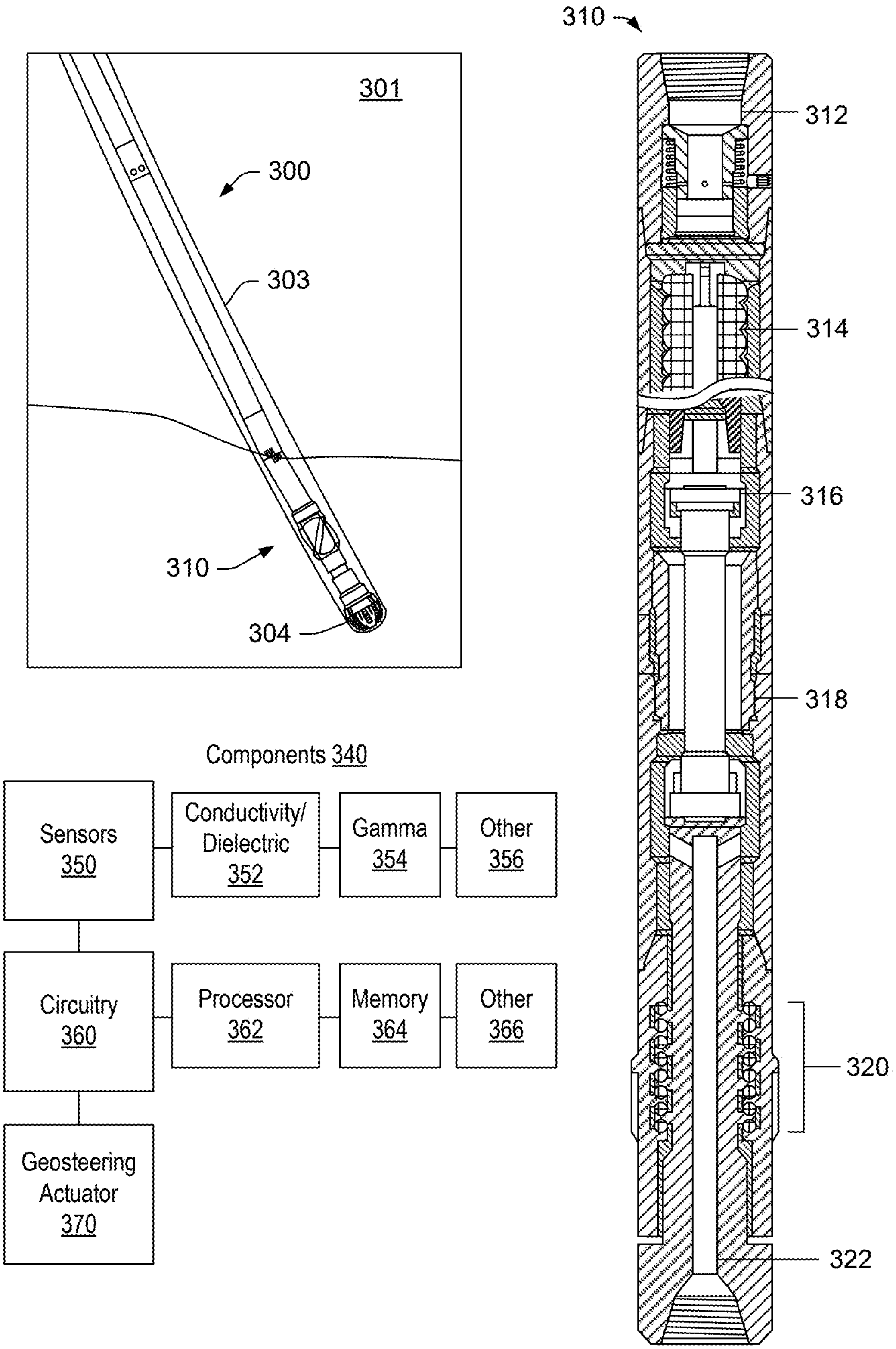
FIG. 3 illustrates an example of a geologic environment with a borehole and an example of a portion of a drillstring that may include various components.

FIG. 3 shows an example of a drilling assembly 300 in a geologic environment 301 that includes a borehole 303 where the drilling assembly 300 (e.g., a drillstring) includes a bit 304 and a motor section 310 where the motor section 310 may drive the bit 304 (e.g., cause the bit 304 to rotate and deepen the borehole 303).

As shown, the motor section 310 may include a dump valve 312, a power section 314, a surface-adjustable bent housing 316, a transmission assembly 318, a bearing section 320 and a drive shaft 322, which may be operatively coupled to a bit such as the bit 304. The motor section 310 of FIG. 3 may be a POWERPAK family motor section (SLB, Houston, Texas) or another type of motor section.

A power section may convert hydraulic energy from drilling fluid into mechanical power to turn a bit. For example, consider the reverse application of the Moineau pump principle. During operation, drilling fluid may be pumped into a power section at a pressure that causes the rotor to rotate within the stator where the rotational force is transmitted through a transmission shaft and drive shaft to a bit.

FIG. 3 also shows examples of components 340 such as, for example, sensors 350, circuitry 360 and a geosteering actuator 370. As shown, the sensors 350 may include a conductivity and dielectric sensor 352, a gamma sensor 354 and one or more other sensors 356. As shown, the circuitry 360 may include a processor 362, memory 364 and one or more other types of circuitries 366. As shown, the geosteering actuator 370 may be operatively coupled to the circuitry 360 and the sensors 350. For example, the circuitry 360 may process signals (e.g., measurements or sensor data) of the sensors 350 to generate one or more commands for actuation of the geosteering actuator 370. In the example of FIG. 3, the geosteering actuator 370 may provide for one or more of PDM actuation and bent sub actuation, for example, to orient the drill bit 304.

Figure 4:
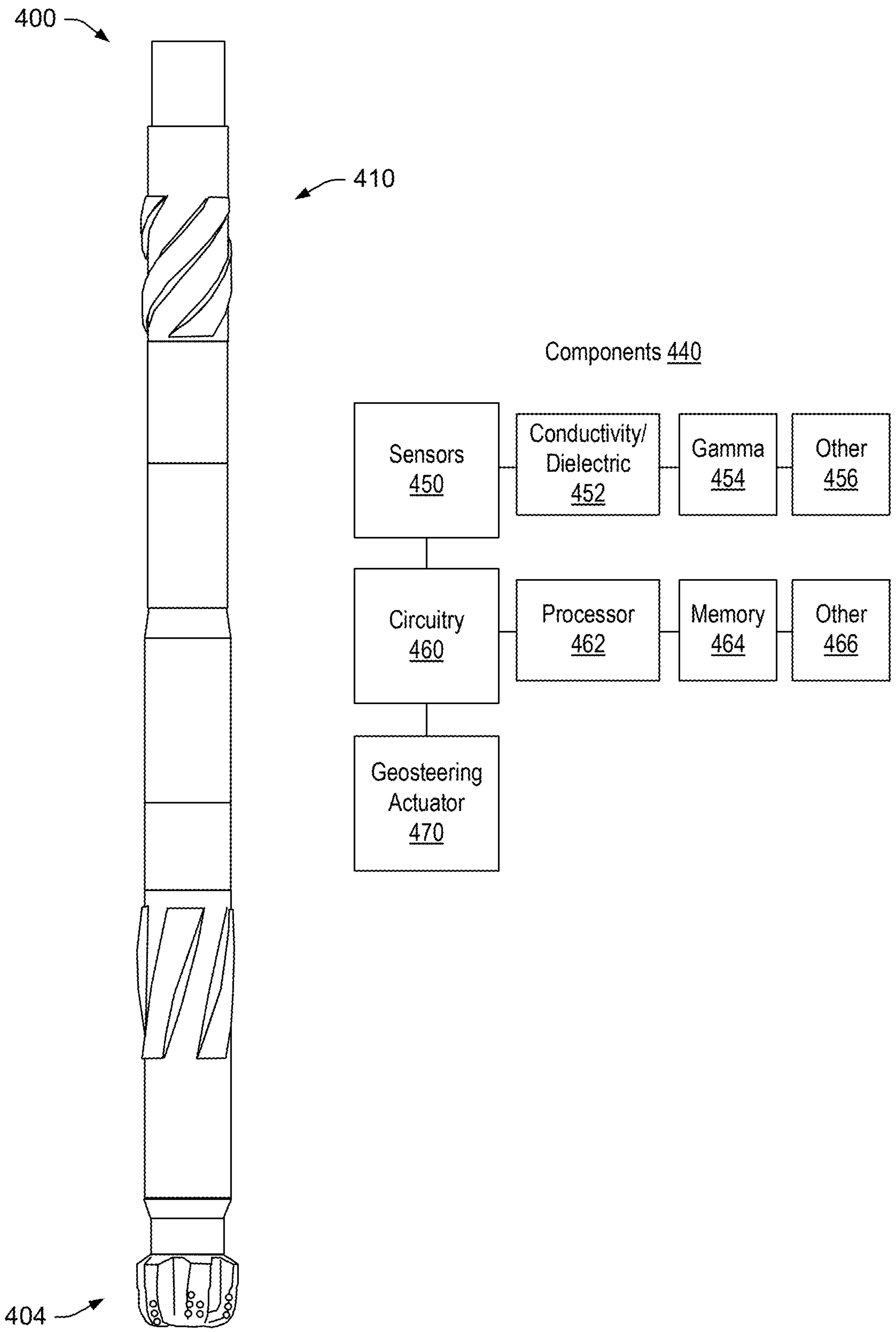
FIG. 4 illustrates an example of a portion of a drillstring that may include various components.

FIG. 4 shows an example of a drilling assembly 400 (e.g., a portion of a drillstring) that includes a bit 404 and a rotary steerable system (RSS) 410. As mentioned, an RSS may be utilized for directional drilling, including geosteering. As an example, the RSS 410 may include one or more features of a POWERDRIVE ARCHER RSS (SLB, Houston, Texas).

FIG. 4 also shows examples of components 440 such as, for example, sensors 450, circuitry 460 and a geosteering actuator 470. As shown, the sensors 450 may include a conductivity and dielectric sensor 452, a gamma sensor 454 and one or more other sensors 456. As shown, the circuitry 460 may include a processor 462, memory 464 and one or more other types of circuitries 466. As shown, the geosteering actuator 470 may be operatively coupled to the circuitry 460 and the sensors 450. For example, the circuitry 460 may process signals (e.g., measurements or sensor data) of the sensors 450 to generate one or more commands for actuation of the geosteering actuator 470. In the example of FIG. 4, the geosteering actuator 470 may provide for RSS actuation, for example, to orient the drill bit 404.

As an example, the drilling assembly 400 may include one or more of a near-bit continuous inclination and azimuth measurement unit or sub, a near-bit azimuthal gamma ray measurement unit or sub, and one or more other types of measurement units or subs.

As an example, a drilling assembly may include one or more types of circuitries. For example, consider a processing unit with a processor and associated memory where one or more sensors may generate signals that may be received by the processing unit. In such an example, the processing unit may perform computations that may utilize information in the signals (e.g., measurements, etc.) to generate commands for geosteering. In such an example, a drilling assembly may be capable of performing, at least in part, downhole geosteering according to geosteering commands generated downhole without transmission of information uphole to a controller and subsequent transmission of information downhole to geosteering equipment. In such an example, at least some types of geosteering processes may be performed more rapidly in response to sensor signals. For example, consider sensor signals indicative of one or more of presence of clay, an amount of clay, a type of clay, and a boundary as an interface between layers, where downhole geosteering equipment may act to steer a drill bit based on one or more of such sensor signals.

As an example, an electromagnetic conductivity measurement tool (ECM tool) may be implemented as a wireline tool and/or implemented as a LWD tool to generate permittivity and conductivity measurements at each frequency for one or more frequencies, which may be interpreted using a petrophysical model. In such an example, output parameters of the model may include water-filled porosity (hence water saturation if the total porosity is known) and water salinity. As an example, parameters that may be output using ECM tool measurements (e.g., induction, propagation, etc.) may include one or more of bulk formation cation exchange capacity (CEC), water saturation (Sw), connate water salinity, Archie cementation exponent and Archie saturation exponent.

Figure 5:
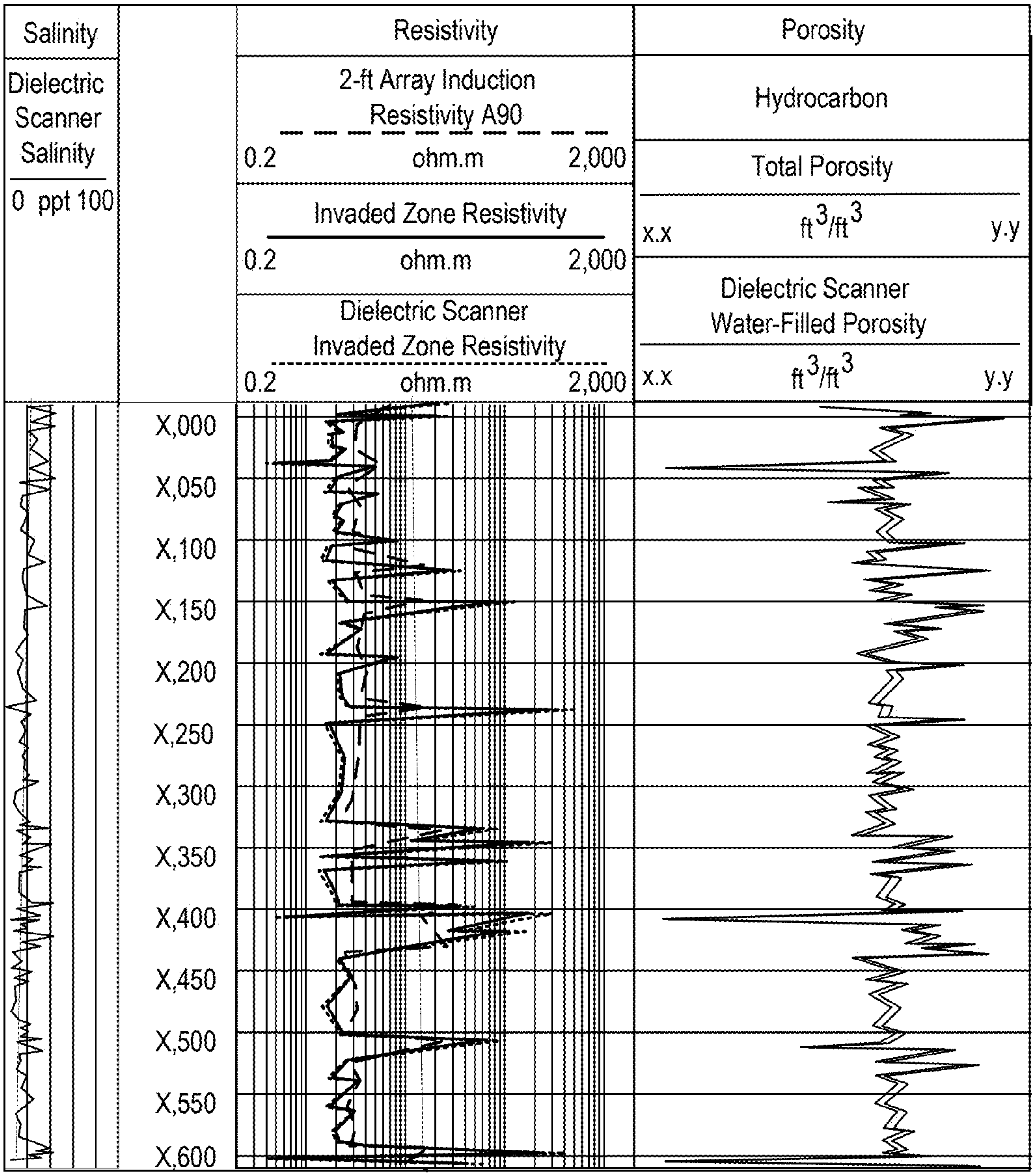
FIG. 5 illustrates examples of logs.

FIG. 5 shows an example of logs 500 from a dielectric scanner tool. Various types of tools may be utilized to acquire logs, for example, consider tools for laterolog operational data at 35 Hz and 280 Hz, resistivity at bit (RAB) operational data at 1.5 kHz, array induction tool (AIT) operational data at 26 kHz and 52 kHz, compensated array resistivity (ARC) operational data at 0.4 MHz and 2 MHz, dielectric propagation tool (DPT) operational data at 25 MHZ, array dielectric tool (ADT) operational data at 0.9 GHz and electromagnetic propagation tool (EPT) operational data at 1.1 GHz.

In the example of FIG. 5, in the logs 500, a log of salinity with respect to depth is shown along with logs of resistivity and porosity with respect to depth where the resistivity log shows array induction resistivity (2 ft, A90), invaded zone resistivity and dielectric scanner invaded zone resistivity and where the porosity log includes total porosity and dielectric scanner water-filled porosity, and optionally hydrocarbons (e.g., based at least in part on water-filled porosity).

As an example, a framework may include components for implementation of a deep learning approach to two-dimensional inversion of electromagnetic data. In such an example, the framework may provide for generation of output for one or more geosteering operations.

As an example, a tool string may include various tools that may acquire downhole measurements in a borehole in a region for computation of resistivity profiles in the region. As an example, a framework may provide for generation of one or more resistivity profiles in a region with acceptable accuracy within seconds. Such an approach may be referred to as a real-time approach or, for example, near real-time (e.g., generation of output in less than 60 seconds).

As an example, a framework may utilize a trained deep learning model (e.g., a deep learning type of machine learning model) that may expedite generation of output such as, for example, one or more resistivity profiles. As to input, a framework may receive resistivity measurements from one or more tools (e.g., consider the ECOSCOPE tool, the PERISCOPE tool, etc.).

As an example, a workflow may include generating a trained deep learning model. For example, such a workflow may include generating input data and output data for training of a deep learning model where the input data may be from one or more types of tools and where the output data are corresponding resistivity profiles in a region that includes a borehole. As an example, the input data and output data may be organized as one or more matrixes.

As mentioned, a deep learning model may be utilized. As an example, a transformer may be utilized where a transformer may be a deep learning architecture based on a multi-head attention mechanism. As an example, a transformer may be a type of architecture that does not include one or more recurrent units. In such an example, training time may be less than that of a recurrent neural architecture (e.g., long short-term memory (LSTM)). As to a multi-head approach, input may be split into encoded tokens where each token may be converted into a vector. As an example, at each layer, each token may be contextualized with other tokens via a parallel multi-head attention mechanism allowing signal(s) for one or more tokens to be amplified while signal(s) of one or more other tokens may be diminished. As an example, a transform may be considered a backbone of a neural network architecture that may be utilized to train a deep learning model.

As an example, a framework may provide for implementation of a trained deep learning model to generation predictions. For example, consider a framework that may receive real-time downhole measurements and make predictions based thereon using a trained deep learning model where such predictions may be generated in real-time or near real-time (e.g., less than 60 seconds).

As an example, a framework may be suitable for implementation using surface equipment and/or using downhole equipment. As an example, a trained deep learning model may be suitable for embedding in surface equipment and/or downhole equipment where downhole measurements (e.g., downhole data) may be generated and received for generation of output.

As an example, a trained deep learning model may provide for multidimensional inversion of electromagnetic data. As an example, a trained deep learning model may provide for receipt of one or more other types of data. As an example, a multidimensional inversion of electromagnetic data may provide for a two-dimensional inversion of electromagnetic data to provide characteristics of a region proximate to a downhole tool disposed in a borehole in the region. In such an example, the region may be or include a reservoir. In such an example, geosteering may be implemented in a manner whereby direction of a drill bit on a drillstring is controlled based at least in part on output of a trained deep learning model.

As mentioned, reflection seismology may be utilized in a seismic survey of a region to provide for generation of seismic data that, for example, may be subjected to inversion to generate an acoustic model of the region. In such an example, the region may include a reservoir or reservoirs. As an example, a borehole trajectory may be planned using at least seismic data where the borehole trajectory connects a surface position (e.g., land surface, ocean bottom surface, etc.) to the reservoir. As an example, such a planned borehole trajectory may be utilized as a basis for drilling where drilling may be further guided via geosteering. As explained, a borehole may be drilled to a reservoir where drilling may include geosteering such that the borehole reaches the reservoir and/or a portion or portions of the borehole are in contact with the reservoir, for example, to maximize borehole and reservoir contact for purposes of producing and/or injecting fluid.

As to use of geosteering, it may provide for more accurate drilling of a borehole with respect to a reservoir. For example, seismic data may be a lesser resolution where various subsurface structures may be known within a range of meters such as, for example, within a range of plus or minus 10 meters to 20 meters. For various types of reservoirs, uncertainty of the order of 10 meters in location of a reservoir may result in missing a reservoir, which, in turn, may result in a reduction in an ability to produce fluid from the reservoir and/or inject fluid into the reservoir (e.g., consider water injection, chemical injection, carbon sequestration, etc.). As explained, geosteering may improve accuracy of drilling such that uncertainties due to seismic data resolution are reduced, which, in turn, may provide for improved borehole construction and field operations (e.g., production, etc.).

As an example, a borehole trajectory may be adjusted during drilling using inversion results generated by a trained deep learning model. As explained, such an approach may provide for real-time adjustment to drilling during drilling where, for example, a drill bit may be directed by one or more mechanisms (e.g., geosteering mechanisms, etc.).

As an example, a workflow may include preparing data for training where input data and output data have been acquired. In such an example, the deep learning model may be trained using the input data and the output data, noting that data may be reserved for one or more of testing, hyperparameter tuning, etc. In such an example, once the trained deep learning model is generated, it may be deployed for field operations. For example, consider deployment locally as being embedded in surface equipment and/or downhole equipment and/or hosted remotely such as, for example, in dedicated servers, equipment of a cloud platform, etc. Once deployed, the trained deep learning model may be utilized to receive input data as acquired by one or more downhole tools on a tool string disposed at least in part in a borehole in a region and to make predictions as to characteristics of the region where, for example, a drill bit of the tool string may be controlled as to direction and/or one or more other parameters to improve one or more of borehole path, drill bit wear, rate of penetration of drill bit, depth of cut of drill bit, borehole wall quality, etc.

As an example, a trained deep learning model may be subjected to further training, testing, tuning, etc. For example, as additional data become available, a trained deep learning model may be improved using at least a portion of the additional data. As an example, additional data may be acquired during drilling that is guided via output of a trained deep learning model where a background process may be executed to revise the trained deep learning model and to replace an existing trained deep learning model upon an indication that the revised trained deep learning model provides superior output compared to the existing trained deep learning model.

As an example, a framework may be operable for various scenarios where, for example, a trained deep learning model may be applied for performing an inversion; noting that one or more other tasks may be suitably performed where, for example, a scenario involves a fixed format of input data and output data. As an example, a framework may provide for generation of a higher quality of job delivery as more and more data are acquired and received such that one or more models may be retrained, further tuned, etc., to thereby make improvements beyond what a current model may be capable of delivering. As an example, a framework may provide for implementation of a continuous improvement loop where data may be received for making improvements and where such data may be acquired for a present job, a concurrent job, an historic job where data become available, for a synthetic job (e.g., a simulated job), an augmented job (e.g., via data augmentation, etc.), etc.

As an example, a framework may provide for time-saving interpretations, knowledge accumulation, and more consistent product quality where, for example, a borehole may be considered a manufactured product. As explained, a job may involve geosteering where, for example, a trained deep learning model may provide for automation of one or more aspects of geosteering. For example, consider a control loop where downhole data are generated and utilized to make predictions as to one or more geosteering parameters such that geosteering may be at least in part automated in a control loop (e.g., consider a closed loop or a loop with a human that may review and confirm a control command, etc.).

As an example, a framework may provide for a reduction in time as to one or more types of geosteering decisions. For example, consider a manual approach where a driller visually reviews graphics rendered to a display such as, for example, two-dimensional graphics generated by an iterative inversion process where the two-dimensional graphics correspond to a slice through a region that includes a borehole with a tool string configured with geosteering capabilities. In such an approach, the driller may have to first wait for completion of the iterative inversion process before the driller may visually assess a boundary between a reservoir and another layer. Once the driller makes such a visual assessment, the driller may then enter one or more geosteering commands for drilling into the reservoir, which may include drilling in a direction away from the other layer. In contrast, a framework that may implement a trained deep learning model may provide for rapid generation of two-dimensional graphics and/or one or more geosteering commands with reference to a multi-dimensional space. Such a framework may provide for substantial time-saving and cost-saving, particularly because the framework may operate using a trained deep learning model rather than an iterative inversion process. As explained, given that a trained deep learning model may generate output rapidly, for example, in real-time or near real-time (e.g., less than 60 seconds), latency may be relatively insubstantial and at a level sufficient for real-time control (e.g., considering rate of penetration and time for a geosteering command to effectively be implemented). As mentioned, a tool or a tool string may include an embedded trained deep learning model where latency may be quite low as to data acquisition and model-based prediction and/or geosteering command generation. In such an approach, one or more aspects of geosteering may be automated downhole in a manner that may be more expeditious than telemetry (e.g., mud pulse telemetry) for uphole and/or downhole transmission.

Figure 6:
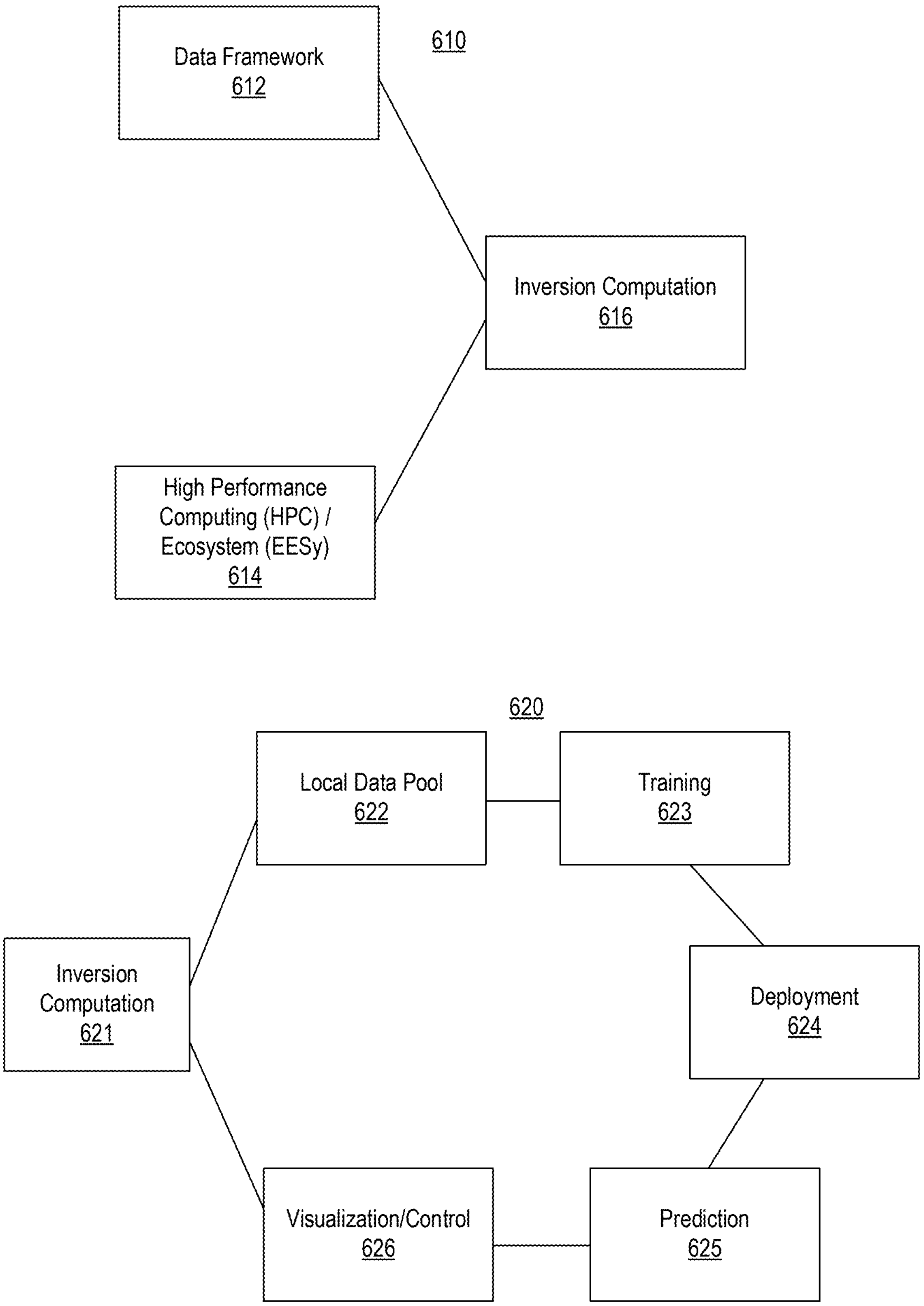
FIG. 6 illustrates examples of workflows.

FIG. 6 shows an example of a workflow 610 and an example of a workflow 620. As shown, the workflow 610 involves receiving data from a data framework (e.g., the INTERACT framework, SLB, Houston, Texas, etc.) and performing an iterative inversion per an inversion computation block 621 using high performance computing (HPC) and/or a cloud platform engine ecosystem (EESy) where the iterative inversion may take minutes to hours to generate a result. As shown, the workflow 620 includes an inversion component block 621, a data block 622 for a local data pool, a training block 623 for training a deep learning model, a deployment block 624 for deployment of a trained deep learning model, a prediction block 625 for generation of a prediction of an inversion result, which may be performed in an amount of time of the order of seconds (e.g., less than 60 seconds), and a visualization and/or control block 626 for visualization and/or control using the prediction.

Figure 7:
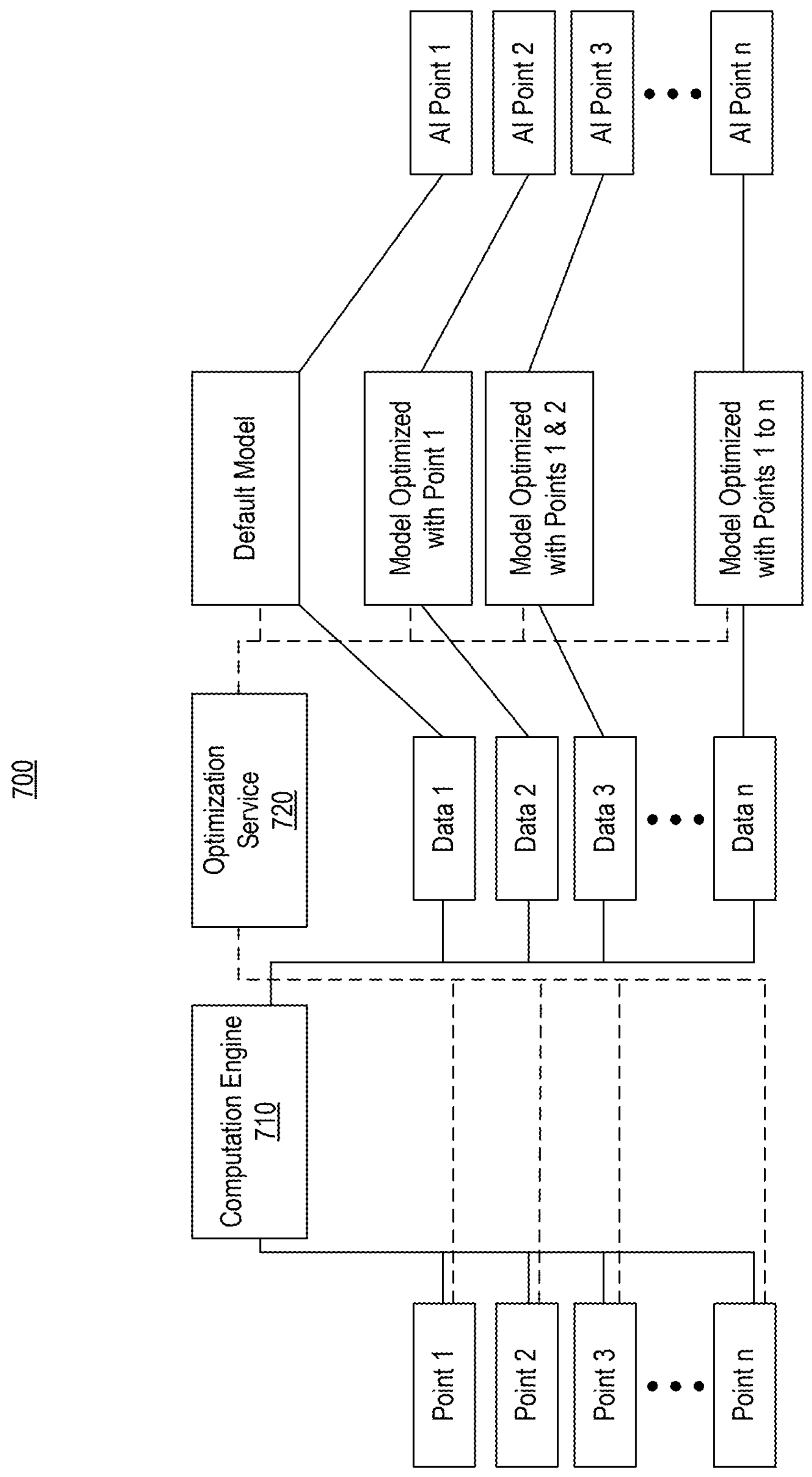
FIG. 7 illustrates an example of a workflow.

FIG. 7 shows an example of a workflow 700 that may be implemented before and/or during field operations that involve drilling a borehole in a region. For example, consider a workflow that may include pre-job planning that may provide for generation of a suitably trained machine learning model, which may be, for example, a deep learning model.

As shown in FIG. 7, the workflow 700 may include utilization of a computation engine 710 that may receive data and generate points that may be received by an optimization service 720. As shown, the optimization service 720 may generate output that may be combined with corresponding data for generation of a number of model variants, for example, a model optimized with a first point, a model optimized with a first and second point, a model optimized with a first point, a second point and a third point, and so on, up to a number of points denoted n. As shown, each of the models may provide for generation of a model-derived corresponding point, which are shown in FIG. 7 as artificial intelligence (AI) points 1 to n.

As an example, during a real-time job, multiple inverters may be utilized where, for example, the multiple inverters may include one or more machine learning model-based inverters and one or more iterative inverters where, for example, a machine learning model-based inverter generates an inversion result more quickly than an iterative inverter. In such an example, a background process may utilize one or more iterative inverters while a foreground process may utilize one or more machine learning model-based inverters. In such an approach, output of the one or more iterative inverters may be utilized for additional training of a version of a currently implemented machine learning model-based inverter where testing may be performed to assess performance of an additionally trained machine learning model-based inverter with respect to the version that is currently implemented. In such an example, once the performance is improved (e.g., according to one or more assessment criteria, which may include factors such as memory utilization, processor demand, etc.), the version currently implemented may be substituted by the improved version.

As an example, input data and output data of a newly computed inversion result may be used to retrain a machine learning model to generate an optimized machine learning model (e.g., for a particular point in time). As explained, an optimized machine learning model may then be used to generate predicts (e.g., inversion results) responsive to receipt of real-time data. In such an example, predictions (e.g., inversion results) of the optimized machine learning model may be more accurate than the predictions of a prior version (e.g., a default machine learning model, a prior optimized version, etc.).

Figure 8:
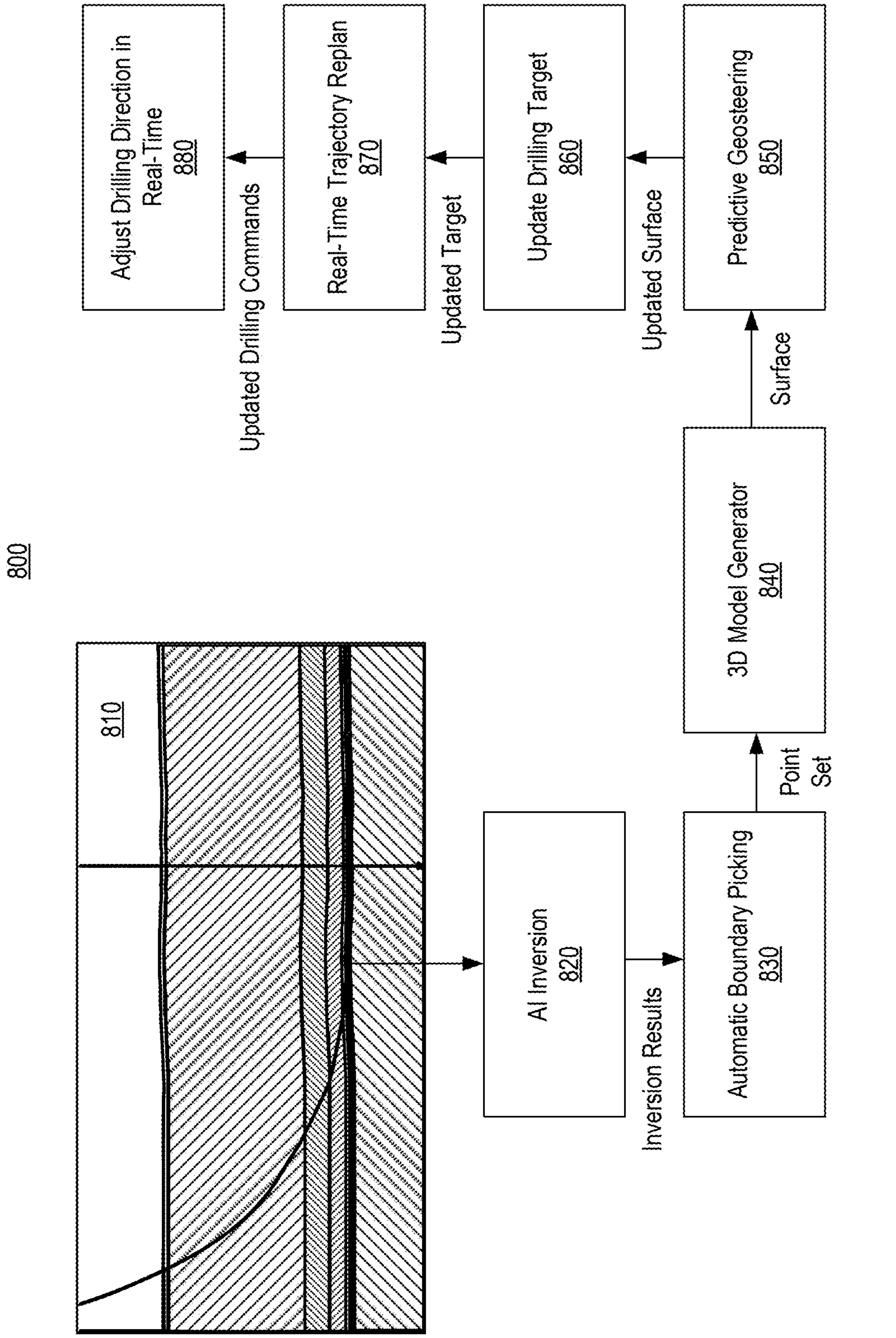
FIG. 8 illustrates an example of a workflow.

FIG. 8 shows an example of a workflow 800 that includes receiving data for a region where a machine learning model may generate inversion results. As shown, data may be acquired using one or more tools disposed in a borehole in a geologic environment 810 where an AI inversion block 820 may perform an inversion to generate inversion results based at least in part on acquired data. As shown, the inversion results may be received by an automatic boundary picking component 830 that generates a point set with points that correspond to various boundaries, which may be layer boundaries. As shown, the point set may be utilized by a 3D model generator 840 to generate a surface that may be utilized by a predictive geosteering component 850 where an updated surface may be generated for receipt of an update drilling target component 860 for updating of a target of a trajectory for drilling, for example, based on a more accurate assessment of a reservoir and/or one or more structures within a region. As shown, given an updated target, a real-time trajectory replan component 870 may provide for generation of one or more updated drilling commands, for example, for an updated trajectory, where one or more of the one or more updated drilling commands may be utilized by an adjustment component 880 to adjust drilling direction in real-time (e.g., real-time control of drilling). As explained, a borehole trajectory may be updated and provided as input for automated geosteering, which may provide for output of one or more drilling commands for real-time or near real-time adjustments of a direction of a drill bit.

Figure 9:
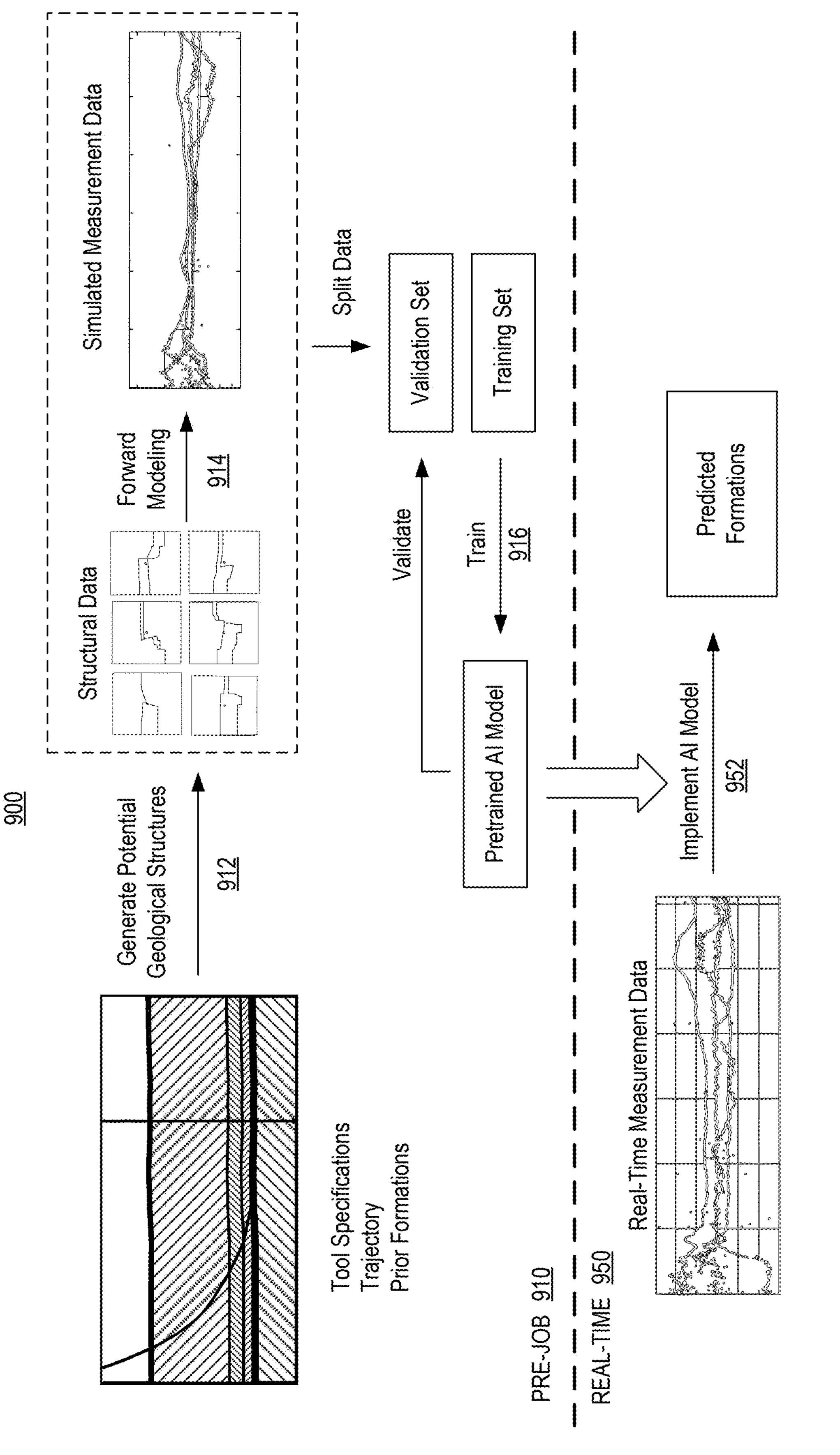
FIG. 9 illustrates an example of a workflow.

FIG. 9 shows an example of a workflow 900 that includes a pre-job portion 910 and a real-time portion 950. In such an approach, the pre-job portion 910 may be performed prior to implementation of a machine learning model in the real-time portion, noting that one or more aspects of the pre-job portion may execute as a background process during the execution of the real-time portion.

As to the pre-job portion 910 of the workflow 900, it may include providing data, which may include, for example, tool specifications, trajectory specifications, and characteristics as to formations, etc., in a region. As shown, the pre-job portion 910 may include generating potential geologic structures 912 based on at least a portion of the data. In such an example, the pre-job portion 910 may provide for generation of training data. For example, consider utilizing one or more of the geologic structures for performing forward modeling 914 to generate simulated measurement data. In such an example, a dataset may be generated that includes data as to geologic structures and corresponding simulated measurement data. As shown, the dataset may be split into a validation set (e.g., a test set) and a training set whereby a machine learning model may be trained, re-trained and/or validated. As shown, training 916 may provide for generation of a pretrained AI model (e.g., a trained ML model). As shown, the pre-job portion 910 may provide for generation of a suitable trained machine learning model for implementation 952 by the real-time portion 950 of the workflow 900.

As shown in the example workflow 900, the real-time portion 950 may include acquiring real-time measurements using one or more downhole tools on a tool string configured for geosteering where the trained machine learning model may be utilized to generate formation predictions, which may be generated responsive to receipt of real-time measurements in a time less than 60 seconds and, for example, less than 10 seconds, or, for example, less than one second. As an example, real-time measurements may be windowed with respect to time and/or distance. For example, FIG. 9 shows various channels of data as to phase angle in degrees with respect to measured depth (MD) in meters. In the example of FIG. 9, a window may be for a particular distance that may be measured from a current position to a prior position, for example, consider a current position at a present time and a prior position from a prior time. As an example, data may be averaged over a window and/or subjected to one or more other statistical techniques. As an example, a trained machine learning model may provide for receipt of data over a period of time and/or a distance, for example, a series data and/or as a pattern. As an example, a trained machine learning model may provide for receipt of data for a current measured depth (MD) and generate results based thereon without a demand for prior data from prior measured depths (MDs).

As explained, input to a trained machine learning model may be an array, which may be a vector as a single dimensional array or a matrix as a multi-dimensional array. As explained, output from a trained machine learning model may be an array, for example, consider a two-dimensional array. As an example, data may include measurements that correspond to a position ahead of a current measured depth and/or to a position behind a current measured depth. As explained, various types of tools may provide for acquisition of multi-dimensional data, which may be, for example, within a field, such as, for example, an electromagnetic field. As explained, a tool may include one or more emitters that may emit energy such as electromagnetic energy within a space in a region where measurements may correspond to the space as a bulk space or where measurements may correspond to increments of the space (e.g., consider techniques that may provide for spatial encoding via gradients, etc.).

As an example, input to a trained machine learning model may be in the form of a two-dimensional array that may be mapped to another two-dimensional array as output. In such an example, the input may correspond to measurements and spatial information and the output may correspond to formation characteristics and spatial information. As explained, a region may include various boundaries, which may define layers where each layer may be a different type of formation (e.g., rock with different characteristics). During geosteering, accurate knowledge of layer boundaries may facilitate drilling of a borehole with a desirable path to reach a target.

Figure 10:
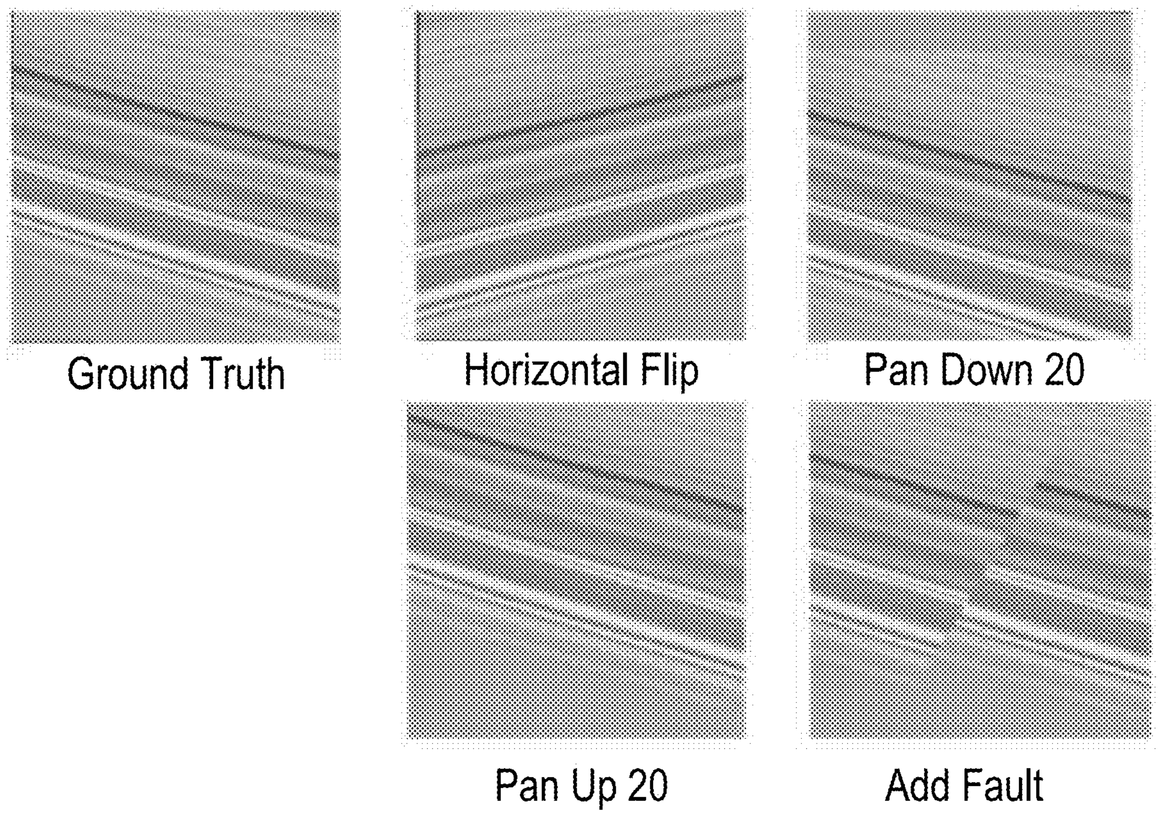
FIG. 10 illustrates examples of data augmentation.

FIG. 10 shows examples of data 1000, which include augmented data. For example, consider data as including actual data that may represent a ground truth where additional data may be generated via implementation of one or more augmentation techniques. For example, consider one or more geometric techniques such as horizontal flipping, panning down, panning up, insertion of a fault with a throw, etc. In various instances, the amount of data for training, testing, tuning, etc., one or more machine learning models may be increased via application of one or more augmentation techniques, which may be based on ground truth data. As explained with respect to the pre-job portion of the workflow 900 of FIG. 9, synthetic data may be generated using one or more geologic structures. As an example, a geologic structure may be subjected to one or more techniques to provide an augmented geologic structure where the augmented geologic structure may be utilized to generate synthetic data where the augmented geologic structure and its corresponding synthetic data may be utilized for training, testing, tuning, etc., of one or more machine learning models.

As an example, data augmentation may be utilized in an effort to improve upon one or more data uncertainty issues in measurement data and/or a structural model. For example, certain measurement data may be amenable to multiple different structural models; whereas, upon providing augmented data and associated structural models, such uncertainty may be reduced. For example, if more types of structures are considered along with their corresponding measurement data (e.g., synthetic or other), a trained machine learning model may more accurately map measurement data more accurately to an actual structure.

As an example, a workflow may include training more than one machine learning model. In such an approach, the machine learning models may have different architectures and/or hyperparameter values. As an example, a common loss function such as mean square error (MSE) may be utilized to compare a number of trained machine learning models. As an example, a best performing trained machine learning model may be selected. For example, for a given set of input, the outputs of a number of machine learning models may be compared, for example, using MSE where ground truth is known for the given set of input. As an example, more than one trained machine learning model may be implemented as part of a real-time framework for geosteering.

As to geologic structures, in geosteering, orientation decisions may depend on location of a resistivity boundary within a geologic structure and value of resistivity of a bed in which a well (e.g., a lateral well) is placed in along with resistivity of one or more adjacent beds. During geosteering, a clean water bearing formation and a shale may exist within a region. In general, a water bearing formation is to be avoided and steered away from to reduce risk of water encroachment or water entry into a well. In contrast, a shale formation may be approached or steered closely to without increasing the risk of consequences from a water bearing formation. As an example, a method may improve geosteering using measurements to perform inversions that may provide for differentiating two beds such that a geosteered borehole have a reduced risk of water breakthrough. While shale is mentioned, as an example, a region may include sand, which may be in addition to shale. For example, consider a shale and sand region.

As an example, a machine learning model may receive a number of input channels of data. For example, consider a machine learning model that receives measurements for three frequencies for each receiver and a number of measurement types, which may include one or more of symmetrized, anti-symmetrized, harmonic resistivity, and harmonic anisotropy. Each of these measurement types may have attenuation and phase shift components where phase shift components may be denoted in degrees. Hence, as an example, a machine learning model may receive approximately 18 channels per receiver. As an example, a machine learning model may also utilize measurements such as, for example, apparent resistivity from one or more tools. As an example, for a two-receiver job, a machine learning model may include approximately 40 channels of input data and a three-receiver job may include approximately 60 channels of input data.

As explained, a particular job may have a particular number of input channels. As an example, different jobs may use different tools (e.g., consider 1, 2 or 3 receivers). Further, as to selection for frequencies, each receiver may utilize one or more frequencies that differ from one or more frequencies of one or more other receivers.

As an example, a machine learning model may provide for receipt of measurements and generate output that provides for a contrast between a reservoir layer and one or more adjacent layers (e.g., consider one or more reservoir boundaries). As an example, a framework may provide for mapping one or more conductive layers above or below or above and below when navigating a tool string within a borehole in a region that includes a reservoir; noting that measurements and computations may also map resistive layers below or above. For example, during landing of a borehole, a resistive reservoir may be mapped below when drilling a shale layer above the resistive reservoir. In such an example, the higher the contrast, the higher the detection range.

As an example, a job may involve prioritizing particular data for transmission. For example, various types of telemetry may have associated latency and/or bandwidth characteristics. As an example, a job may include prioritizing real-time frame data to ensure that a framework receives measurements that provide for acceptable resolution and latency. As an example, a framework may provide one or more parameter values for telemetry such that relevant data points (e.g., measurements) are included in a frame with a particular frequency (e.g., how often the frame is transmitted). Where a job may include equipment suitable for implementation of wired telemetry (e.g., wired drill pipe (WDP)), latency may be less of an issue when compared to telemetry that relies on mud-pulse technology (e.g., acoustic pulses encoded and transmitted via mud in a borehole). As explained, where mud pulse telemetry is utilized, a frame may be designed optimally considering measurement resolution, as may be associated with a trained machine learning model that may provide for inverting measurements (e.g., predictions as to geologic structures).

As an example, channels may be constructed from EM measurements acquired by one or more tools and/or via one or more modeling techniques (e.g., synthetic data). As an example, a job may utilize one or more tools that may have one or more different measurements as may be defined for one or more purposes (e.g., different, same, etc.). As an example, some measurements may be sensitive to distance to boundary and contrast, while others may be sensitive to dip, and yet others sensitive to anisotropy while yet others are sensitive to resistivity. As an example, measurements may include shallow apparent resistivity measurements, though, for various jobs, their contribution may be less than that of one or more other types of data. As an example, a framework may provide for including different measurement types with different frequencies to map layers of a region (e.g., thicknesses and resistivities) and, for example, dip and anisotropy of one or more layers. As an example, for a number of channels from different measurement types, a framework may provide for specifying spacings and frequencies in a mapping where, for example, weighting of may differ.

As an example, a machine learning model may include one or more types of components, architectures, etc. For example, consider a ResNet model where various models may be generated by changing the number of layers and the shape of the convolution kernels, which may be determined via parameter finetuning. A ResNet model may be a deep learning model in which weight layers learn residual functions with reference to the layer inputs.

As an example, a machine learning model may include one or more components of an architecture of a TransformerNet. For example, consider an architecture that includes adding multiple layers of a CNN to enlarge features before sending to them to a transformer structure. As explained, a transformer architecture may include a multi-head mechanism; noting that a transformer architecture may be found in various natural language processing application (e.g., consider GPT, etc.). As an example, a machine learning model may be constructed to receive input a form akin to an image (e.g., a pixel image) where, for example, to improve performance, an architecture may include some additional layers to extract 2D information prior to implementation of a transformer. As an example, a machine learning model may be defined by a number of layers, a number of attention heads and a size of the model, which may be also included in parameter finetuning.

As an example, a machine learning model may include one or more components of a vision transformer (ViT) architecture. As an example, a ViT may be adjusted via a number of layers and a number of attention heads, for example, where one or more of such parameters may be finetuned.

As an example, a ViT architecture may be a type of transformer architecture designed for computer vision or otherwise receipt of input that may be in the form of pixels (e.g., two-dimensional images, etc.). As an example, a ViT architecture may provide components to break down input images (e.g., multidimensional arrays) into a series of patches that may then be tokenized before applying the tokens to a transformer architecture. For a ViT architecture, an attention mechanism may repeatedly transform representation vectors of patches, incorporating more and more relations between patches in an input array. Such an approach may be viewed as somewhat analogous as to how, in natural language processing, as representation vectors flow through a transformer, they incorporate more and more semantic relations between words, from syntax to semantics.

As an example, a machine learning model may be a classifier. For example, consider a ViT that may turn an image (e.g., an array) into a sequence of vector representations where, to use the vector representation for downstream applications, one or more network modules may be added. For example, to use it for classification, a shallow MLP may be added on top of it that outputs a probability distribution over classes.

As an example, a model may be defined using Y to represent input and X to represent output where Y equals H (X) where the model may be a proxy model of $H^{-1}$. For example, Y may include real-time channels (e.g., well logs), which, as explained may or may not be windowed. As to X, it may, for example, be a two-dimensional data structure such as a square with a fixed size that represents a resistivity profile of a region in space. Given an equation Y=H (X), an iterative inversion technique aims to solve X from Y. As explained, where a machine learning model is utilized, it may be a proxy model of $H^{-1}$ such that $X=H^{-1}$ (Y). Hence, the input Y may be received by the machine learning model to provide X as output. In such an approach, X may be considered to be a prediction as predicted by the machine learning model for the given input Y.

Figure 11:
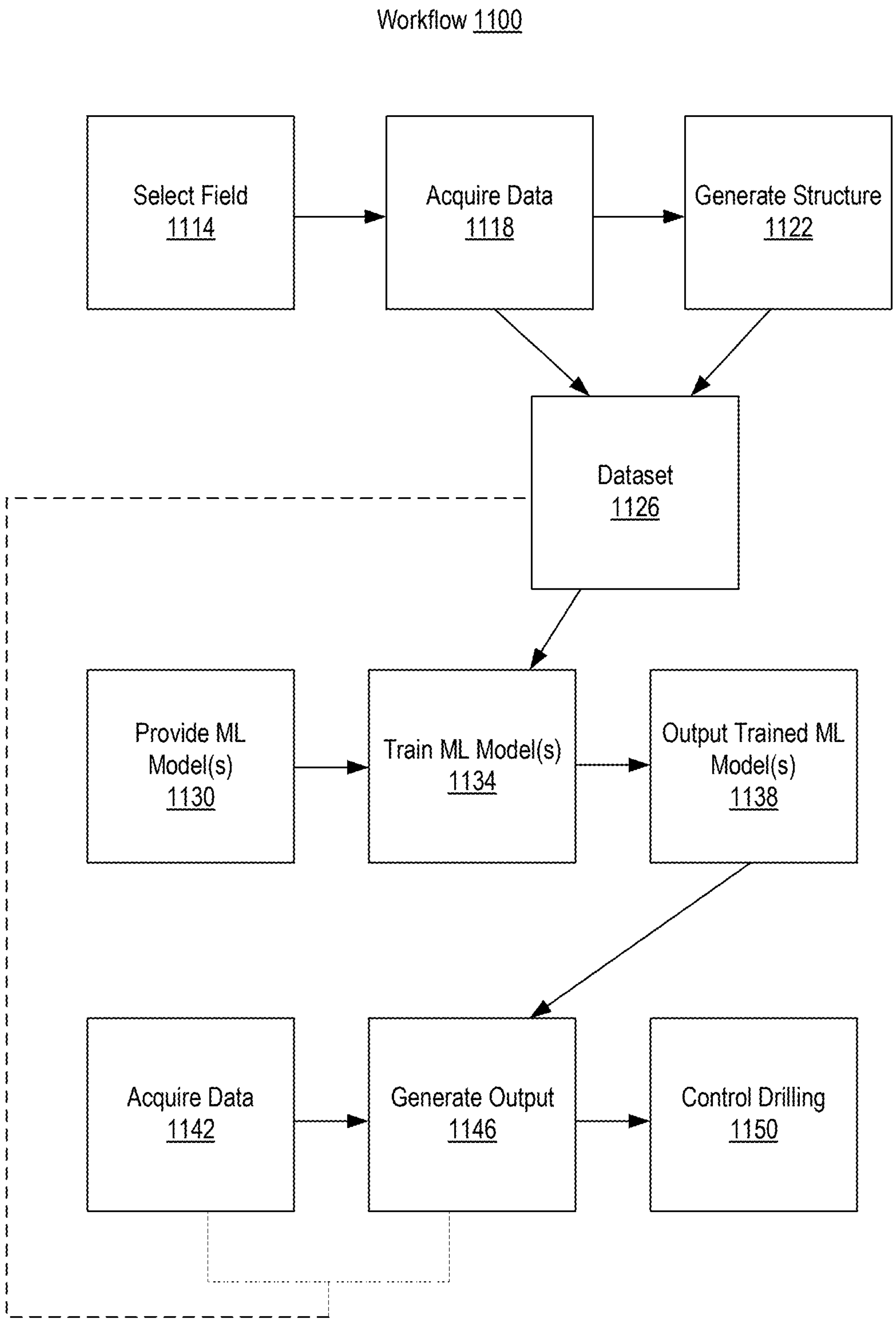
FIG. 11 illustrates an example of a workflow.

FIG. 11 shows an example of a workflow 1100 that includes a selection block 1114 for selecting a field, an acquisition block 1118 for acquiring data, a generation block 1122 for generating structure where the data and the structure may be utilized to create a dataset block 1126 (that includes a dataset). As explained, such an approach may utilize an iterative inversion to generate the structure from the acquired data, noting that one or more techniques may be utilized as to data augmentation, etc. As an example, for a given structure, a forward modeling technique may provide for generation of synthetic measurement data. As an example, one or more aspects of a job may be included in a workflow for generation of one or more datasets. For example, type or types of tools may be considered, types of formations, etc.

As shown in FIG. 11, a provision block 1130 may be included for providing one or more machine learning models, a train block 1134 for training the one or more machine learning models, and an output block 1138 for outputting the one or more machine learning models.

As shown in FIG. 11, an acquisition block 1142 may be included for acquiring data using one or more downhole tools using a tool string disposed at least in part in a borehole in a region, a generation block 1146 for generating output using one or more of the one or more machine learning models, and a control block 1150 for controlling drilling using the tool string where the tool string includes a drill bit that may be directed by one or more geosteering techniques.

As shown in FIG. 11, the workflow 1100 may provide for continuous learning, re-training, etc. For example, acquired data from the acquisition block 1142 and output generated by the generation block 1146 may be utilized to form one or more datasets, which may be provided to a dataset block 1126 for purposes of continuous learning, re-training, etc., of one or more machine learning models; noting that one or more of the blocks 1114, 1118 and 1122 may provide for additional data (e.g., for the selected field, another field, etc.).

Figure 12:
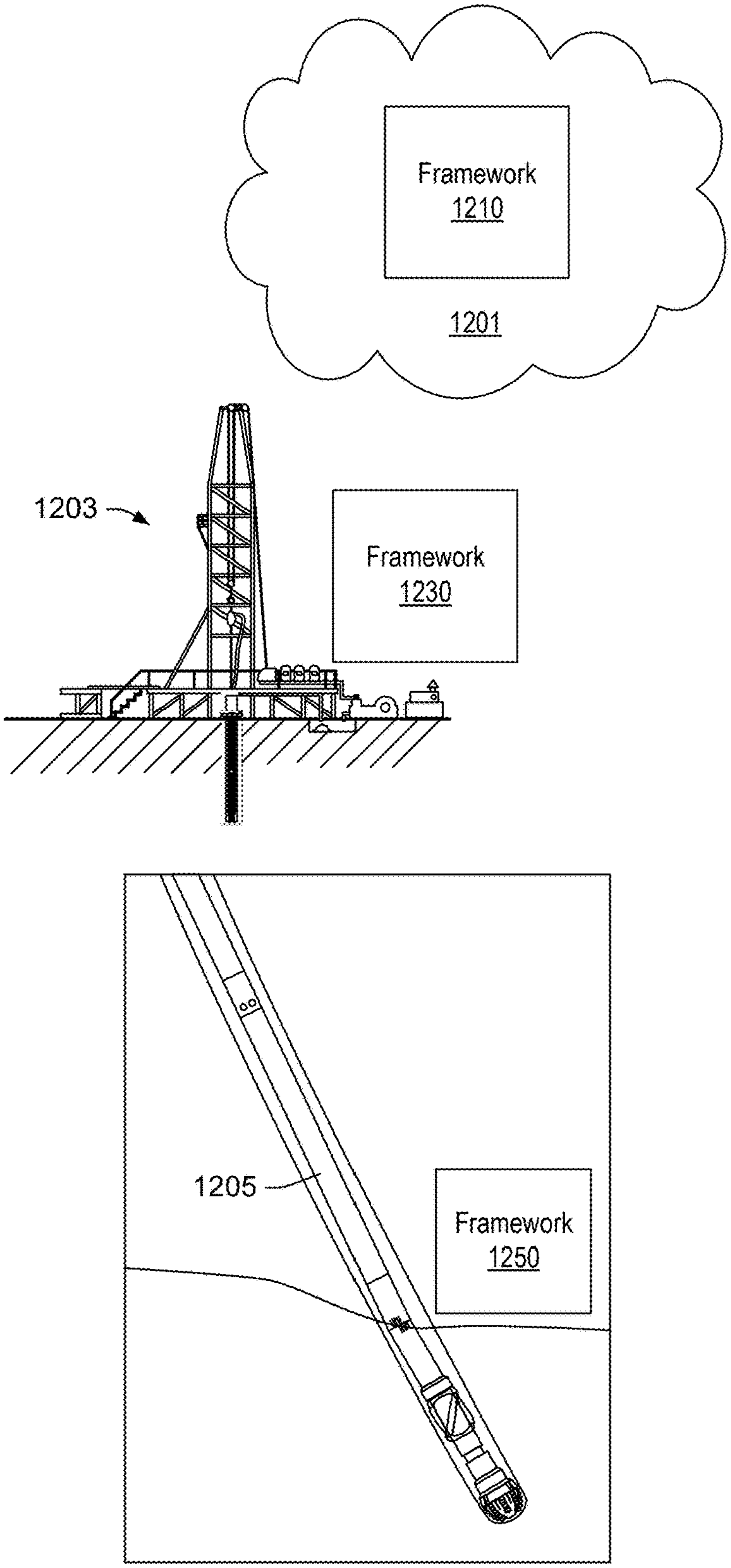
FIG. 12 illustrates examples of environments and frameworks.

FIG. 12 shows various examples of environments 1201, 1203 and 1205 that may host frameworks 1210, 1220 and 1230. For example, the environment 1201 may be a cloud platform environment that may host the framework 1210, which may provide for generating and/or implementing one or more machine learning models, the environment 1203 may be a rig site environment that may host the framework 1220, which may provide for generating and/or implementing one or more machine learning models, and the environment 1205 may be a tool string environment that may host the framework 1230, which may provide for generating and/or implementing one or more machine learning models. As an example, equipment at the rig site environment 1203 may be operatively coupled to equipment of the cloud platform environment 1201 and/or the tool string environment 1205.

As an example, a tool string may include an embedded framework that may provide for downhole automated control of one or more operations of the tool string, which may include, for example, geosteering. As an example, a rig control system (RCS) may include an embedded framework that may provide for control of one or more operations, which may include, for example, geosteering. In such an example, one or more levels of automation may be implemented such that the framework forms part of a control loop, which may be a closed control loop and/or a human-in-the-loop (HITL) type of control loop. As an example, a cloud platform may be utilized for one or more purposes, which may include model building, model updating, data access, synthetic data generation, etc. As an example, where a model is to be updated, an updated model may be provided via one or more environments for implementation in the field, for example, at a rig site environment and/or in a tool string environment.

As to types of machine learning models, consider one or more of a support vector machine (SVM) model, a k-nearest neighbors (KNN) model, an ensemble classifier model, a neural network (NN) model, etc. As an example, a machine learning model may be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model (ML model), may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open-source software library for dataflow programming that includes a symbolic math library, which may be implemented for machine learning applications that may include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method may include various actions that may operate on a dataset to train an ML model. As an example, a dataset may be split into training data and test data where test data may provide for evaluation. A method may include cross-validation of parameters and best parameters, which may be provided for model training.

The TENSORFLOW framework may run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations may be expressed as stateful dataflow graphs; noting that the name TENSORFLOW derives from the operations that such neural networks perform on multidimensional data arrays. Such arrays may be referred to as "tensors".

As an example, a device may utilize TENSORFLOW LITE (TFL) or another type of lightweight framework. For example, consider a gateway that may be in the field (e.g., on-site) and that may utilize the TFL and/or one or more other types of lightweight frameworks. The TFL framework is a set of tools that enables on-device machine learning where models may run on mobile, embedded, and IoT devices. The TFL framework is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). The TFL framework offers multiple platform support, covering ANDROID and iOS devices, embedded LINUX, and microcontrollers. The TFL framework offers diverse language support includes JAVA, SWIFT, Objective-C, C++, and PYTHON. The TFL framework may provide high performance via hardware acceleration and model optimization.

Figure 13:
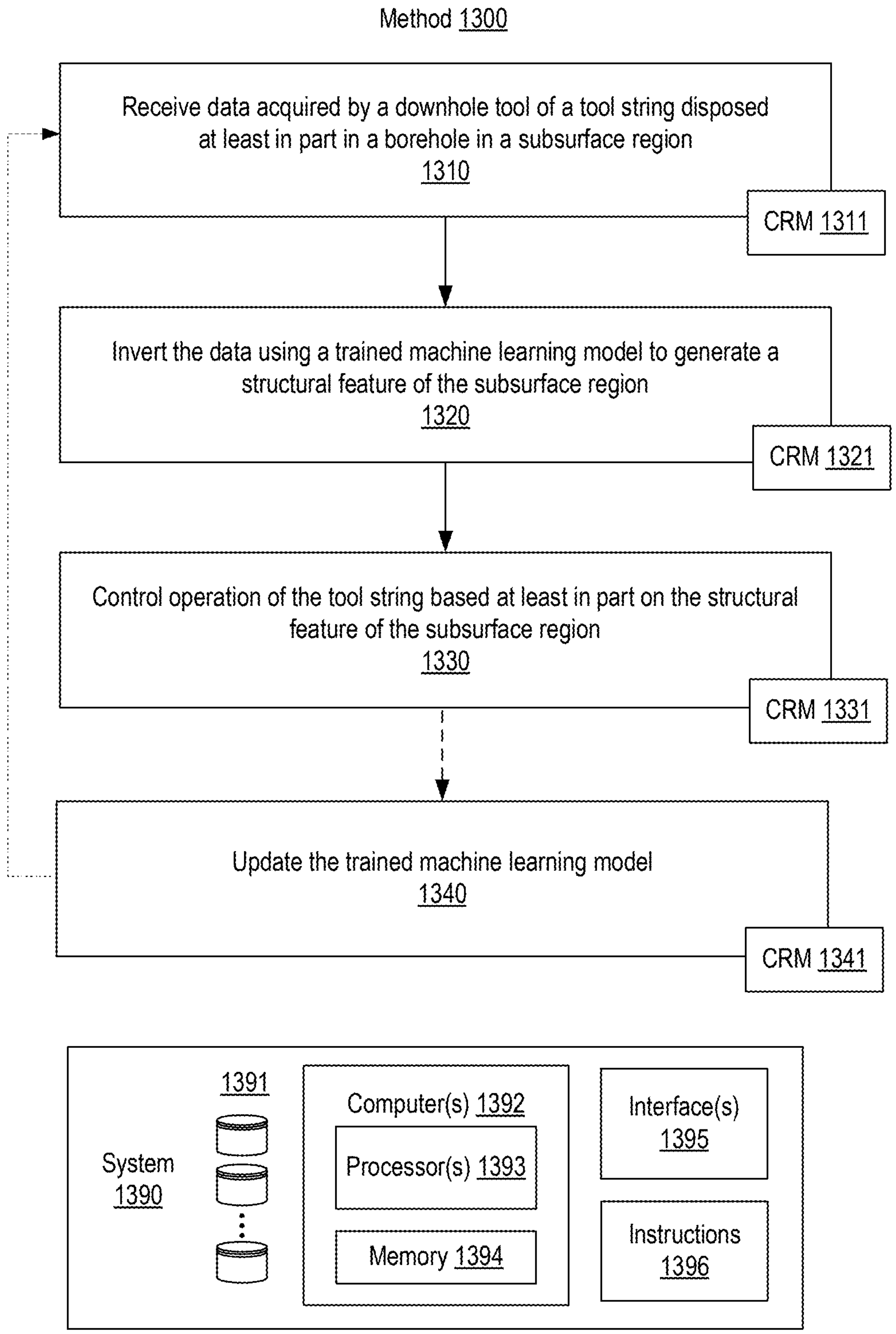
FIG. 13 illustrates an example of a method and an example of a system.

FIG. 13 shows an example of a method 1300 that includes a reception block 1310 for receiving data acquired by a downhole tool of a tool string disposed at least in part in a borehole in a subsurface region; an inversion block 1320 for inverting the data using a trained machine learning model to generate a structural feature of the subsurface region; and a control block 1330 for controlling operation of the tool string based at least in part on the structural feature of the subsurface region. As shown, the method 1300 may optionally include an update block 1340 for updating the trained machine learning model.

The method 1300 of FIG. 13 is shown as including various computer-readable storage medium (CRM) blocks 1311, 1321, 1331, and 1341 that may include processor-executable instructions that may instruct a computing system, which may be a control system, to perform one or more of the actions described with respect to the method 1300.

As shown in the example of FIG. 13, the system 1390 may include one or more computers 1392 that include one or more processors 1393, memory 1394 operatively coupled to at least one of the one or more processors 1393, instructions 1396 that may be, for example, stored in the memory 1394, and one or more interfaces 1395 (e.g., one or more network interfaces and/or other interfaces). As an example, the system 1390 may include one or more processor-readable media that include processor-executable instructions executable by at least one of the one or more processors 1393 to cause the system 1390 to perform actions such as, for example, one or more actions of the method 1300. As an example, the instructions 1396 may include instructions of one or more of the CRM blocks 1311, 1321, 1331, and 1341. The memory 1394 may be or include the one or more processor-readable media where the processor-executable instructions may be or include instructions. As an example, a processor-readable medium may be a computer-readable storage medium that is non-transitory that is not a signal and that is not a carrier wave.

As an example, the system 1390 may include subsystems. For example, the system 1390 may include a plurality of subsystems that may operate using equipment that is distributed where a subsystem may be referred to as being a system. For example, consider a downhole tool system and a surface system. As an example, operations of the blocks 1310, 1320, 1330 and 1340 of the method 1300 may be performed using a downhole tool system. The method 1300 may be implemented using, for example, a downhole system and/or a surface system, which may be a cloud-based or cloud-coupled system.

As an example, a method may include receiving data acquired by a downhole tool of a tool string disposed at least in part in a borehole in a subsurface region; inverting the data using a trained machine learning model to generate a structural feature of the subsurface region; and controlling operation of the tool string based at least in part on the structural feature of the subsurface region. In such an example, the data may include electromagnetic data (e.g., attenuation, phase, etc.) where the structural feature may be a structural feature in a resistivity profile of at least a portion of the subsurface region. In such an example, the electromagnetic data may include channels of electromagnetic data for a number of receivers of the downhole tool and/or may include channels of electromagnetic data for a number of frequencies.

As an example, a structural feature may be or include a boundary between a reservoir layer and another layer in a subsurface region. In such an example, a method may include controlling operation of a tool string by, for example, geosteering a drill bit of the tool string to drill further into the subsurface region. In such an example, geosteering may steer the drill bit away from the boundary toward the reservoir layer.

As an example, a trained machine learning model may be or include a deep learning model.

As an example, a method may include training a machine learning model to generate a trained machine learning model. In such an example, training may include accessing log data from a database, iteratively inverting the log data to generate one or more structural models, and associating the log data and the one or more structural models as a training set for training the machine learning model.

As an example, a method may include updating a trained machine learning model with a revised, trained machine learning model. In such an example, updating may include iteratively inverting data to generate one or more structural models, where the data and the one or more structural models form a training set, and further training the trained machine learning model using the training set to generate the revised, trained machine learning model. In such an example, a method may include performing the iteratively inverting and the further training as a background process. As an example, a method may include performing at least a portion of such a background process using equipment of a cloud platform.

As an example, a machine learning model-based inverting technique may occur in less than 10 seconds. In such an example, a method may include controlling that occurs within 60 seconds from receiving data. For example, consider a control loop that may receive data, perform an inversion using at least a portion of the data and a trained machine learning model, and controlling drilling based at least in part on the inversion within a period of time of several minutes or less (e.g., less than one minute). In such an example, the control loop may be considered to be a real-time control loop that may provide for real-time control (e.g., real-time geosteering control).

As an example, a tool string may include circuitry where a trained machine learning model may be embedded in the circuitry for performing inverting within the tool string. For example, consider a tool string that may perform inverting and that may perform control of one or more components of the tool string based at least in part on the inverting. As an example, a tool string may include components suitable for implementing a control loop that may be a real-time control loop.

As an example, a method may include receiving data by a rig control system via mud-pulse telemetry. For example, consider a downhole tool that may generate data using one or more sensors where downhole telemetry equipment may utilize mud-pulse telemetry to transmit the data (e.g., raw, compressed, encoded, etc.) to an uphole telemetry receiver. In such an example, the mud-pulse telemetry may introduce some amount of latency, which may depend, for example, on depth of a BHA in a borehole, etc.

As an example, a system may include a processor; memory accessible to the processor; processor-executable instructions stored in the memory and executable by the processor to instruct the system to: receive data acquired by a downhole tool of a tool string disposed at least in part in a borehole in a subsurface region; invert the data using a trained machine learning model to generate a structural feature of the subsurface region; and control operation of the tool string based at least in part on the structural feature of the subsurface region.

As an example, one or more non-transitory computer-readable storage media may include processor-executable instructions executable to instruct a processor to: receive data acquired by a downhole tool of a tool string disposed at least in part in a borehole in a subsurface region; invert the data using a trained machine learning model to generate a structural feature of the subsurface region; and control operation of the tool string based at least in part on the structural feature of the subsurface region.

As an example, one or more computer-readable storage media may include processor-executable instructions to instruct a computing system to perform one or more methods. In such an example, the one or more computer-readable storage media may be a program product (e.g., a computer program product, a computer system program product, etc.).

Figure 14:
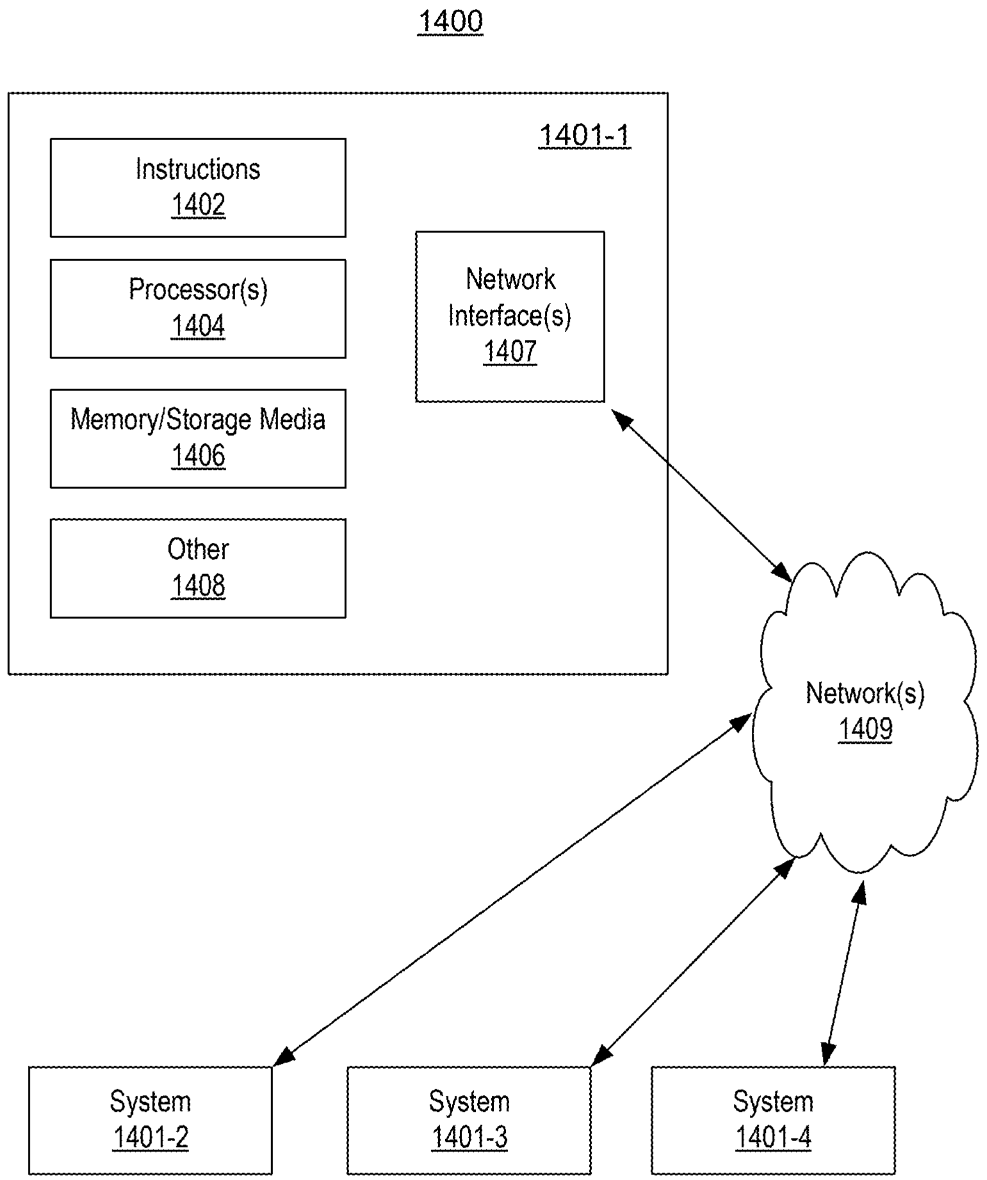
FIG. 14 illustrates examples of computing and networking equipment.

In some embodiments, a method or methods may be executed by a computing system. FIG. 14 shows an example of a system 1400 that may include one or more computing systems 1401-1, 1401-2, 1401-3 and 1401-4, which may be operatively coupled via one or more networks 1409, which may include wired and/or wireless networks.

As an example, a system may include an individual computer system or an arrangement of distributed computer systems. In the example of FIG. 14, the computer system 1401-1 may include one or more sets of instructions 1402, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 1404, which is (or are) operatively coupled to one or more storage media 1406 (e.g., via wire, wirelessly, etc.). As an example, one or more of the one or more processors 1404 may be operatively coupled to at least one of one or more network interface 1407. In such an example, the computer system 1401-1 may transmit and/or receive information, for example, via the one or more networks 1409 (e.g., consider one or more of the Internet, a private network, a cellular network, a satellite network, etc.). As shown, one or more other components 1408 may be included.

As an example, the computer system 1401-1 may receive from and/or transmit information to one or more other devices, which may be or include, for example, one or more of the computer systems 1401-2, etc. A device may be located in a physical location that differs from that of the computer system 1401-1. As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the storage media 1406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that may be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

receiving data acquired by a downhole tool of a tool string disposed at least in part in a borehole in a subsurface region, wherein the data comprise multi-channel electromagnetic data from receivers, wherein each of the receivers operates at multiple frequencies, and wherein the multi-channel electromagnetic data comprise one or more of attenuation data and phase data;

inverting the data using a trained machine learning model to generate inversion results, wherein the data are non-windowed data or windowed data for a selected window size;

performing automated boundary picking using the inversion results to generate one or more points for a structural feature of the subsurface region; and controlling operation of the tool string based at least in part on at least a portion of the one or more points for the structural feature of the subsurface region.

2. The method of claim 1, wherein the inversion results comprise a resistivity profile of at least a portion of the subsurface region and wherein the structural feature comprises a structural feature identifiable in the resistivity profile of at least a portion of the subsurface region.

3. The method of claim 1, wherein the structural feature comprises a boundary between a reservoir layer and another layer in the subsurface region.

4. The method of claim 3, wherein the controlling operation of the tool string comprises geosteering a drill bit of the tool string to drill further into the subsurface region.

5. The method of claim 4, wherein the geosteering steers the drill bit away from the boundary toward the reservoir layer based at least in part on the one or more points.

6. The method of claim 1, wherein the trained machine learning model comprises a deep learning model that comprises a transformer architecture and a multi-head attention mechanism for splitting the data into encoded tokens where each token is converted into a vector.

7. The method of claim 1, comprising training a machine learning model to generate the trained machine learning model.

8. The method of claim 7, wherein the training comprises accessing log data from a database, iteratively inverting the log data to generate one or more structural models, and associating the log data and the one or more structural models as a training set for training the machine learning model.

9. The method of claim 1, comprising updating the trained machine learning model with a revised, trained machine learning model.

10. The method of claim 9, wherein the updating comprises iteratively inverting the data to generate one or more resistivity profiles, wherein the data and the one or more resistivity profiles form a training set, and further training the trained machine learning model using the training set to generate the revised, trained machine learning model.

11. The method of claim 10, comprising performing the iteratively inverting and the further training as a background process.

12. The method of claim 11, comprising performing at least a portion of the background process using equipment of a cloud platform.

13. The method of claim 1, wherein the inverting occurs in less than 10 seconds.

14. The method of claim 13, wherein the controlling occurs within 60 seconds from the receiving.

15. The method of claim 1, wherein the tool string comprises circuitry and wherein the trained machine learning model is embedded in the circuitry for performing the inverting within the tool string.

16. The method of claim 1, wherein the receiving comprises receiving the data by a rig control system via mud-pulse telemetry.

17. The method of claim 1, wherein the selected window size corresponds to an adjustable window size parameter with respect to time or distance.

18. The method of claim 1, wherein the data are non-windowed data that correspond to a measured depth of the tool string in the borehole.

19. A system comprising:

a processor;

memory accessible to the processor;

processor-executable instructions stored in the memory and executable by the processor to instruct the system to:

receive data acquired by a downhole tool of a tool string disposed at least in part in a borehole in a subsurface region, wherein the data comprise multi-channel electromagnetic data from receivers, wherein each of the receivers operates at multiple frequencies, and wherein the multi-channel electromagnetic data comprise one or more of attenuation data and phase data;

invert the data using a trained machine learning model to generate inversion results, wherein the data are non-windowed data or windowed data for a selected window size;

perform automated boundary picking using the inversion results to generate one or more points for a structural feature of the subsurface region; and control operation of the tool string based at least in part on at least a portion of the one or more points for the structural feature of the subsurface region.

20. One or more non-transitory computer-readable storage media comprising processor-executable instructions executable to instruct a processor to:

receive data acquired by a downhole tool of a tool string disposed at least in part in a borehole in a subsurface region, wherein the data comprise multi-channel electromagnetic data from receivers, wherein each of the receivers operates at multiple frequencies, and wherein the multi-channel electromagnetic data comprise one or more of attenuation data and phase data;

invert the data using a trained machine learning model to generate inversion results, wherein the data are non-windowed data or windowed data for a selected window size;

perform automated boundary picking using the inversion results to generate one or more points for a structural feature of the subsurface region; and control operation of the tool string based at least in part on at least a portion of the one or more points for the structural feature of the subsurface region.

* * * * *